United States Patent
Reisch et al.

(10) Patent No.: US 10,495,157 B2
(45) Date of Patent: Dec. 3, 2019

(54) FRICTIONAL SHIFTING ELEMENT FOR A VEHICLE TRANSMISSION

(71) Applicant: ZF Friedrichshafen AG, Friedrichshafen (DE)

(72) Inventors: Matthias Reisch, Ravensburg (DE); Christian Sibla, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 183 days.

(21) Appl. No.: 15/741,608

(22) PCT Filed: Jun. 7, 2016

(86) PCT No.: PCT/EP2016/062822
§ 371 (c)(1),
(2) Date: Jan. 3, 2018

(87) PCT Pub. No.: WO2017/005433
PCT Pub. Date: Jan. 12, 2017

(65) Prior Publication Data
US 2018/0195561 A1   Jul. 12, 2018

(30) Foreign Application Priority Data

Jul. 7, 2015 (DE) ........................ 10 2015 212 662

(51) Int. Cl.
*F16D 13/52* (2006.01)
*F16D 13/64* (2006.01)
(Continued)

(52) U.S. Cl.
CPC ........... *F16D 13/683* (2013.01); *F16D 13/52* (2013.01); *F16D 13/648* (2013.01); *F16D 13/69* (2013.01)

(58) Field of Classification Search
CPC ........ F16D 13/683; F16D 13/52; F16D 13/69; F16D 13/648
See application file for complete search history.

(56) References Cited

U.S. PATENT DOCUMENTS

| | | | |
|---|---|---|---|
| 3,412,836 A | 11/1968 | Wilmer | |
| 3,550,740 A | 12/1970 | LeBlanc et al. | |
| (Continued) | | | |

FOREIGN PATENT DOCUMENTS

| | | |
|---|---|---|
| DE | 1917554 A1 | 11/1969 |
| DE | 20011435 U1 | 11/2000 |
| (Continued) | | |

OTHER PUBLICATIONS

German Search Report DE102015212662.5, dated Feb. 3, 2016. (10 pages).

(Continued)

*Primary Examiner* — Jacob S. Scott
*Assistant Examiner* — Lillian T Nguyen
(74) *Attorney, Agent, or Firm* — Dority & Manning, P.A.

(57) ABSTRACT

A frictional shift element for a transmission of a vehicle, including a first friction element and a second friction element, wherein one friction element of the first and second friction elements has an approximately annular friction surface, and the other friction element of the first and second friction elements has an approximately annular base body and a plurality of friction surface elements distributed over a periphery of the approximately annular base body. The friction surface and the plurality of friction surface elements are brought into contact with each other in an overlap area for transmitting torque, wherein the friction surface elements protrude radially into the overlap area. The one friction element with the friction surface, the other friction element, and the friction surface elements are each formed (Continued)

as one piece. The one friction element and the approximately annular base body of the other friction element are spaced radially apart.

18 Claims, 19 Drawing Sheets

(51) Int. Cl.
*F16D 13/68* (2006.01)
*F16D 13/69* (2006.01)

(56) References Cited

U.S. PATENT DOCUMENTS

| | | | | |
|---|---|---|---|---|
| 6,719,110 | B2* | 4/2004 | Ishikawa | F16D 25/123 |
| | | | | 192/113.34 |
| 7,137,490 | B2* | 11/2006 | Fabricius | F16D 13/648 |
| | | | | 188/250 D |
| 7,478,719 | B2* | 1/2009 | Voegele | F16D 13/648 |
| | | | | 192/107 R |
| 9,097,289 | B2* | 8/2015 | Youngwerth | F16D 13/648 |
| 9,206,866 | B2 | 12/2015 | Giese et al. | |
| 9,841,065 | B2* | 12/2017 | Okamura | F16D 13/74 |
| 9,856,922 | B2* | 1/2018 | Reisch | F16D 13/648 |
| 9,909,628 | B2* | 3/2018 | Bauer | F16D 23/06 |
| 9,982,748 | B2* | 5/2018 | Yin | F16F 15/1201 |
| 2004/0195068 | A1 | 10/2004 | Sudau | |
| 2007/0056821 | A1 | 3/2007 | Toya | |
| 2008/0156601 | A1 | 7/2008 | Himmelsbach et al. | |
| 2011/0290609 | A1 | 12/2011 | Ziemer et al. | |
| 2012/0181136 | A1 | 7/2012 | Dziurda et al. | |
| 2014/0144747 | A1 | 5/2014 | Hemphill et al. | |
| 2014/0166427 | A1 | 6/2014 | Youngwerth et al. | |
| 2018/0051754 | A1* | 2/2018 | Lindemann | F16D 13/648 |
| 2019/0048954 | A1* | 2/2019 | Bernhardt | F16D 13/74 |

FOREIGN PATENT DOCUMENTS

| | | |
|---|---|---|
| DE | 10315169 A1 | 11/2004 |
| DE | 102004016291 A1 | 10/2005 |
| DE | 102009001101 A1 | 8/2010 |
| DE | 102009027017 A1 | 12/2010 |
| DE | 102011010912 A1 | 8/2012 |
| DE | 102013222760 A1 | 5/2014 |
| DE | 102013216747 A1 | 2/2015 |
| DE | 102014200854 A1 | 7/2015 |
| EP | 1650454 A1 | 4/2006 |
| GB | 814992 A | 6/1959 |

OTHER PUBLICATIONS

International Search Report (English Translation) PCT/EP2016/062822, dated Sep. 21, 2016. (3 pages).

* cited by examiner

FRICTIONAL SHIFTING ELEMENT FOR A VEHICLE TRANSMISSION

FIELD OF THE INVENTION

The present invention relates to a frictional shift element for a transmission of a vehicle with a first friction element and a second friction element with overlapping friction surfaces which can be brought into contact with each other for transmitting torque, wherein the second friction element is the friction partner, the first or the second friction element has a friction surface that is approximately annular, and the respective other friction element has, as the corresponding friction surface, a plurality of friction surface elements which are distributed over the periphery of an approximately annular base body of the first or second friction element, wherein the friction surface elements protrude radially into the overlap area.

BACKGROUND

The frictional shift element, for example, in a multi-disk design or the like, is provided for a transmission, in particular, an automatic transmission of a vehicle. The first friction element may be allocated to a first carrier, for example, an internal multi-disk carrier or an external multi-disk carrier. The second friction element may be allocated to a second carrier, for example, an external multi-disk carrier or an internal multi-disk carrier. A plurality of friction elements may form a multi-disk pack, wherein the first and second friction elements are arranged alternately in the axial direction one behind the other and can be pressed against each other through an actuation in the engaged state of the frictional shift element, in order to implement the transmission of torque between each of the packs of the first and second friction elements.

For example, a transmission with a plurality of frictionally engaging shift elements in order to obtain various gear ratios is known from the published document DE 10 2009 001 101 A1. The frictionally engaging shift elements are disk shift elements, where the internal disks and the external disks have unlined friction surfaces, in order to increase the permissible surface pressure, so that the shift element can be made smaller in size with the same ability to transmit the torque and causes lower drag torque in the disengaged operating condition.

Furthermore, the published document DE 10 2009 027 017 A1 discloses a multi-disk pack for a multi-disk brake or a multi-disk clutch, in which a spring action is integrated into the disks, so that a desired distance between the disks is also provided in the disengaged operating condition of the multi-disk pack. This arrangement results in a clearance in the entire multi-disk pack.

DE 10 315 169 A1 discloses a clutch assembly, in which friction lining-carrying friction elements and friction elements without a friction lining interact and in which the friction lining-carrying friction elements have a fluid transport surface arrangement for generating a fluid circulation, which flows around the friction elements and which is implemented predominantly by the friction surface elements that are distributed over the periphery of the friction element.

GB 8 14 992 A discloses a friction element, which includes a disk and friction linings on both sides of the disk, where a part of the friction lining is connected to a spring element on at least one side of the disk, wherein the friction linings are connected to a friction lining carrier of the friction element by adhesive bonding or by riveting.

One drawback of these frictional shift elements is that there may still be high drag torque. The yet unpublished DE 10 2014 200 854 of the applicant shows a frictional shift element with a low drag torque. This feature is achieved, on the one hand, by dispensing with friction linings and, on the other hand, by forming the friction surface element in one piece, i.e., integrally forming the friction surface element, on the friction element. One disadvantage lies in the still fairly high consumption of material for the manufacture of the friction elements of a frictional shift element. In addition, the friction elements have to be made of the same material as the friction surface elements.

Furthermore, EP 1 650 454 A1 discloses support plates of friction disks, which are made of several segments in order to cut the costs; and, as a result, there is less punching waste.

SUMMARY OF THE INVENTION

The object of the present invention is to provide a frictional shift element for a transmission of a vehicle that is manufactured as cost effectively as possible, causes the least possible drag torque and, in addition, consumes less material in production and, therefore, further improves the already advantageous invention from DE 10 2014 200 854. Moreover, another aspect of the present invention is to provide a method for manufacturing that is cost effective and reduces the amount of material used.

This is achieved, according to the invention, in that the first or second friction element with the friction surface, which is approximately annular, the respective other friction element, and also the friction surface element are formed as one piece each; and that the first or second friction element and the approximately annular base body of the respective other friction element are spaced radially apart from each other.

One drawback in the prior art is that the friction surface elements and the approximately annular base body in integrally formed embodiments are necessarily made of the same material. If the material-related requirements with respect to optimum wear, strength, coefficient of friction profile and drag torque characteristics were to be satisfied, the entire disk would have to be made necessarily of a high quality material. Since the disk has a very large surface area, as compared to the friction surface, a large consumption of high quality material is required. Owing to the "multi-part" design of the friction element and the friction surface element, wherein each approximately tooth-shaped friction surface element is formed on the annular base body of the friction element, it is possible to use different materials or stock. In particular, the material for the friction element may be of a lower grade material and considerably cheaper than the material for the rubbing friction surface elements.

It has also been found that it is possible, according to the solution of the invention, to manufacture, for example, the internal disk from the "punching waste" of the external disk, since the parts do not overlap radially. That is, there is no radial overlap between the approximately annular base body of the one disk and the friction disk with the annular friction surface. The friction contact is achieved exclusively by way of the friction surface elements arranged on the annular body. In this way the punching waste is significantly reduced, which results in a substantial reduction in cost.

The advantage of the friction surface elements, which protrude radially into the overlap area, is that the contact surface or, more specifically, the corresponding friction surfaces between the two friction elements is/are reduced by repeatedly interrupting in the circumferential direction the friction surface through the provision of individual friction lugs or friction teeth on one of the friction elements, thus, either on the first or on the second friction element. The interruptions in the circumferential direction are implemented, for example, by recesses between the provided friction surface elements or, more specifically, the friction lugs or friction teeth. Therefore, the first and second friction elements that can be brought into frictional engagement with each other, are spaced apart from each other in the radial direction, irrespective of the protruding friction surface elements, in order to reduce the overlap area or, more specifically, to reduce the overlapping friction surfaces. This arrangement allows the coolant and/or lubricant, for example, oil or the like, to pass through in radial direction virtually unimpeded. Furthermore, the contact surface, in which drag torques are generated through the shearing of the coolant and lubricant, is confined to a minimum.

Another advantage of the frictional shift element, according to the invention, is that neither a friction lining nor a friction body has to be glued, riveted or secured in any other way to the friction surface element, as known, for example, with respect to clutches from the prior art, since the friction surface element of the frictional shift element of the present invention is formed in one piece.

Thus, it is known to provide so-called radially inwardly or radially outwardly protruding friction lining carriers, for example, with friction linings, which can be glued on, or with a punched hole for receiving ceramic plates, where said friction lining carriers could have a geometry and arrangement at the friction element, which is similar to the friction surface element of the frictional shift element of the invention. In this case, however, only the friction linings or rather the ceramic plates act as the friction partners with a counter disk, so that a radially inwardly or radially outwardly protruding friction surface element, as known from the prior art, was always made in several parts, since it always had one friction lining carrier and at least one friction lining.

The concept "one-piece design" means not only that the friction surface element does not have a friction lining, but it also means that the friction surface element is formed in one piece. Hence, an inventive friction element with a friction surface element is always formed in several parts and is not integrally formed, as is the case, for example in DE 10 2014 200 854, where the friction elements are formed with the respective friction surface elements in one piece.

Preferably it can be provided in accordance with an advantageous embodiment of the invention that the frictional shift element is a wet running frictional shift element, in which a fluid, preferably oil, is passed through the friction element pack or, more specifically, the multi-disk pack in the area of the friction surfaces for the purpose of lubrication and cooling.

Preferably the proposed frictional shift element may be used in automatic transmissions as a disengaging shift element, since with such shift elements, full power shifts are possible without thermally loading this frictional shift element. A disengaging shift element is characterized in that the frictional shift element is engaged in the lowest gear, is disengaged in the highest gear and, upon sequential shifting through all of the gear stages, only changes the shifting state once.

Thus, the proposed shift element produces particularly low drag torques, as a result of which the fuel consumption of the vehicle is significantly reduced. Furthermore, the reduced friction surfaces lead to a lower mass and a small installation space requirement as well as lower costs of manufacturing. Furthermore, the mass moment of inertia is lower, so that it is possible to achieve better driving dynamics with a vehicle that is provided with the inventive frictional shift element in the transmission.

In addition, a frictional shift element is preferred, in which the respective other friction element has recesses, and that the friction surface elements are received in the respective recesses.

The recesses, also called joining points, have a back taper or undercut, as a result of which the friction surface element is held in a substantially positive locking manner. The design of the required back taper or undercut is known, for example, from puzzle pieces or the prior art. Preferably the respective recess is an interference fit. Furthermore, it is preferred that the recesses of the respective other friction element partially interrupt the approximately annular base body along its inner circumference or outer circumference.

Furthermore, it is preferred that the friction surface element be formed on the annular friction element over various radii located one behind the other. In particular, it is preferred that the recesses and their immediate surroundings define the friction surface element zones and that the respective intermediate zones be arranged between the friction surface element zones adjoining in the circumferential direction, wherein the respective intermediate zone has a central zone and two transition zones, enclosing the central zone, wherein said central zone has a first radius $R_3$, and the respective transition zone has a radius $R_4$; and wherein each transition zone is tangential to a central zone and a friction surface element zone.

The radius may be, for example, greater in the area of the outer circumference of the annular base body of the friction element than at the end of the tooth-shaped friction surface of the friction surface element. In this way the transition from the protruding friction surface element to the base body is optimized with respect to its stress distribution. The annular cross section is enlarged in the direction of the friction surface element, so that, on the whole, the multi-disk pack may be more compact in the radial direction. Consequently, upon transmission of power, the friction surface element introduces a bending moment into the annular geometry. In order to optimize the resulting stress flow at the friction element, it is advisable to begin the curvature, based on the annular geometry, initially with a larger radius and then to continue with a smaller radius in the direction of the friction surface element. The geometric shape or rather the course of the radii at the friction surface element can be presented differently on both sides of the friction tooth or rather the friction surface element 5 (preferred direction of rotation).

It is also preferred that the friction surface elements be fixed by fixing means on the respective other friction element. In particular, it is preferred that the friction surface elements be fixed by forming on the respective other friction element. In this way the friction surface element is secured in the disk, in particular, against slipping out laterally, in particular, axially.

Moreover, it is preferred that the friction surface elements be fixed on the corresponding friction element at least point by point along a joint line. The joint line is that line, which defines, when viewed from the axial direction, the extension of the recess in the circumferential direction and/or in the radial direction. The friction surface elements are secured by forming on the approximately annular base. The joining process can be carried out in individual areas, i.e., point by point, of the joint line or even along the entire joint line. For example, it is possible to achieve by so-called caulking a positive and non-positive connection between the friction element and the friction surface element through plastic deformation of an edge region of at least one of the parts. In contrast to welding, different materials are joinable together. In addition, higher torques are transmittable over caulked connections.

Furthermore, it is preferred that the friction surface elements have chamfers along the joint line. The fixing can further simplify a chamfer at the respective thinner part in the area of the joint line.

In addition, it is preferred that the friction surface elements be welded to the respective other friction element. One advantage of welding is that it is possible to dispense with fixing by forming for the friction surface elements that are connected in a positive locking manner. In this case it is also possible to dispense with a back taper or undercut.

Moreover, it is preferred that the respective other friction element have at least a first thickness in the axial direction and that the respective friction surface element have at least a second thickness in the axial direction, wherein the at least first and the at least second thickness are not the same. It is particularly preferred that the second thickness be less than the first thickness. This feature allows each of the components to be optimized specifically for their requirements. For example, it simplifies the fixing of the slightly thinner friction surface element by the forming process.

It is preferred that the friction surface elements have chamfers in an inlet and/or an outlet area in the circumferential direction. If the chamfers are introduced at those points, where the counter disk runs into and/or ends in the friction zone, then the drag torque is further reducible.

Furthermore, it is preferred that the friction surface elements have grooves. A suitable grooving further significantly reduces the drag torque and increases the stability under load.

Furthermore, it is preferred that the friction surface elements be made of steel. Moreover, it is preferred that the friction surface elements be sintered. It is also preferred that the friction surface elements be made of ceramic.

According to another aspect of the present invention, a method is provided, particularly a method for producing a frictional shift element for a transmission of a vehicle with a first friction element and a second friction element, wherein the first or the second friction element has a friction surface that is approximately annular, wherein the respective other friction element has an approximately annular base body, said method including the steps of:
manufacturing the second friction element from a semi-finished product of a first material in a first step, wherein the semi-finished product has a substantially cylindrical recess,
manufacturing the approximately annular base body of the first friction element from the semi-finished product from the first step in a subsequent second step, wherein the production is carried out substantially coaxially to the cylindrical recess,
or including the steps of:
manufacturing the approximately annular base body of the second friction element from a semi-finished product of a first material in a first step, wherein a substantially cylindrical recess is generated in the semi-finished product,
manufacturing the first friction element from the semi-finished product from the first step in a subsequent second step, wherein the production is carried out substantially coaxially to the cylindrical recess.

The advantage of the method of the invention is that the first friction element, for example, an external disk, is manufactured coaxially to the second friction element, for example, an internal disk, whereas in the case of a disk only the approximately annular base body is manufactured. In contrast to the prior art, the inventive feature allows the corresponding disks to be manufactured "in each other". That means that there are not two internal parts to be scrapped, as are produced by the conventional method for manufacturing disks. In this order of sequence, the internal disk is manufactured from the material waste of the external disk.

Moreover, a method is preferred, in which the second friction element is punched from a sheet metal strip and, in so doing, produces punching waste, and that the first friction element is punched out of the punching waste.

Particularly preferred is a method, in which a plurality of friction surface elements is made of the first material or a second material.

It has been found that different materials, i.e., stock, are usable for the friction element and the friction surface element. This aspect may result in a significant cost reduction, since it suffices to produce only the friction surface element, which is smaller than the friction element, from a higher quality and more expensive material.

Furthermore, a method is preferred, in which a plurality of recesses is made in the first or second friction element for receiving the friction surface elements.

In addition, it is preferred that the method combines the friction surface elements with the first or second friction element.

Particularly preferred is a method, in which the friction surface elements are inserted into the recesses.

Furthermore, a method is preferred, in which in order to fix the friction surface elements on the first or second friction element, a forming process, for example, caulking, is carried out on the friction surface element and/or on the first or second friction element. In addition, a method is preferred, in which the friction surface elements are welded to the first or second friction element.

Moreover, a method is preferred and, in particular, a method for producing a frictional shift element for a transmission of a vehicle with a first friction element and a second friction element, wherein the first or the second friction element has a friction surface that is approximately annular, wherein the respective other friction element has an approximately annular base body, said method including the steps of:
manufacturing the first friction element from a semi-finished product of a first material in a first step, wherein material waste is produced,
manufacturing the approximately annular base body of the second friction element from this material waste in a subsequent second step,
or including the steps of:
manufacturing the approximately annular base body of the first friction element from a semi-finished product of a first material in a first step, wherein material waste is produced,
manufacturing the second friction element from this material waste in a subsequent second step.

This method takes into account the production in reverse order, thus, manufacturing, in particular, punching, an external disk from the material waste of an internal disk, wherein in the case of one of the two disks not the complete disk is made, but rather only the approximately annular base body. After the second step, the above described process steps can follow in full.

An additional aspect of the present invention is that at least one friction element of the respective adjacent first and second friction elements on the friction surfaces that face each other is beveled, conical or axially tapered in the cross section or in the axial direction. Due to the fact that, for example, the internal and/or external friction elements are flattened or designed in a similar manner, there is a reduction in the amount of installation space required in the axial direction. Furthermore, a higher degree of strength is attained at the same time, because the disks or, more specifically, the friction elements are thicker or rather stronger in the highly stressed areas. In particular, areas where the synchronized gear tooth system is provided on the friction elements are referred to as the highly stressed areas. In addition, this aspect results in better heat dissipation, since the friction surface elements are attached to the annular cross section of each friction element over a wider area. As a result, the resistance to thermal stress is higher. In addition, it is advantageous that owing to the flattening or rather the cone effect, lower axial contact forces are necessary in order to engage the frictional shift element. Furthermore, a lower degree of forming is required to produce the frictional shift element.

An additional aspect of the invention is that a forced distancing is to be provided for the proposed frictional shift element, as a result of which adjacent friction elements are held at a distance even in the disengaged state, and have no effect in the loaded state, i.e., when the frictional shift element is engaged. The forced distancing may be achieved, for example, by at least one spring clip element, which is resilient in the axial direction of the friction element, or the like provided on at least one friction surface element in the circumferential direction. Owing to this forced distancing of the friction elements in a multi-disk pack, coolant and/or lubricant may flow through radially with less flow resistance. Thus, the shear forces in the intermediate space are lower, and the drag torque is reduced.

The frictional shift element may be actuated hydraulically, pneumatically, electro-mechanically or mechanically. Preferably the wet-running frictional shift element is actuated hydraulically, since the existing coolant and lubricant is usable as the hydraulic medium. The friction elements of the proposed frictional shift element may be made of sheet metal, steel or the like. The steel may contain carbon, for example, C15, C60, C75. The friction elements may be hardened (for example, nitrocarburized or gas nitrided). As the coating of the friction elements it is possible to provide, analogously to synchronization, for example, sintering, molybdenum, carbon or the like. Furthermore, at least one of the friction elements may have a groove or the like, for example, a parallel groove, a waffle groove, a bottleneck groove, analogous to paper linings.

The proposed frictional shift element may be used in a power shifting transmission. It is also conceivable that the frictional shift element is used in a continuously variable multi-range transmission or in an electric vehicle drive. Additional possible applications are use as an all-wheel decoupling, retarder decouplings, a quick-reversing group and a range group.

The present invention claims, in addition to the above described frictional shift element, an automatic transmission for a vehicle with such a frictional shift element.

BRIEF DESCRIPTION OF THE DRAWINGS

The present invention is described in detail below with reference to the drawings. The drawings show in.

DETAILED DESCRIPTION

Figure 1:
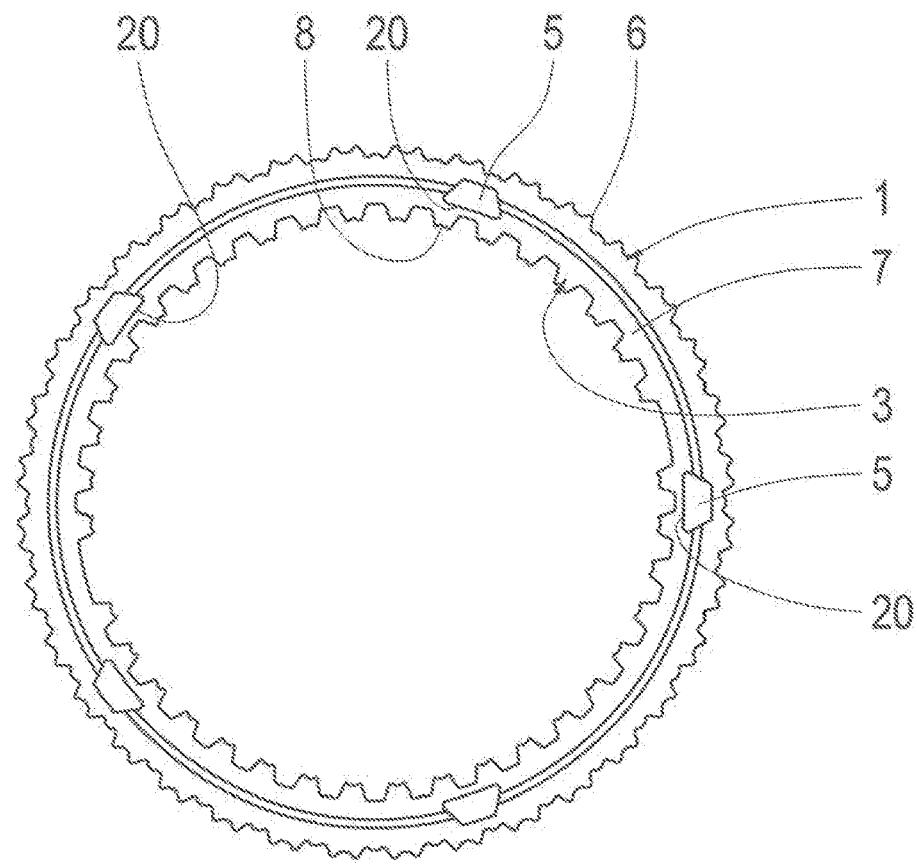
FIGS. 1 and 2 show various views of a part of a frictional shift element in accordance with the invention with a friction element, as an internal disk, with a plurality of friction surface elements projecting radially outwardly.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1 to 27 show various embodiments of an inventive frictional shift element for a transmission of a vehicle, for example as a multi-disk shift element. The frictional shift element includes a plurality of first friction elements 1, which are mounted in a rotationally rigid manner on a first carrier 2, and a plurality of second friction elements 3, which are mounted in a rotationally rigid manner on a second carrier 4. The first and second friction elements 1, 3 are alternately arranged one behind the other as a multi-disk pack, so that overlapping friction surfaces are produced between a first friction element 1 and a second friction element 2. For the transmission of torque, the friction elements 1 and 3 are pressed together in the axial direction.

Each of the first or second friction elements 1, 3 has a friction surface that is approximately annular, and each of the other friction elements 1, 3 has, as the corresponding friction surface, a plurality of friction surface elements 5 that protrude radially in the overlap area.

Figure 2:
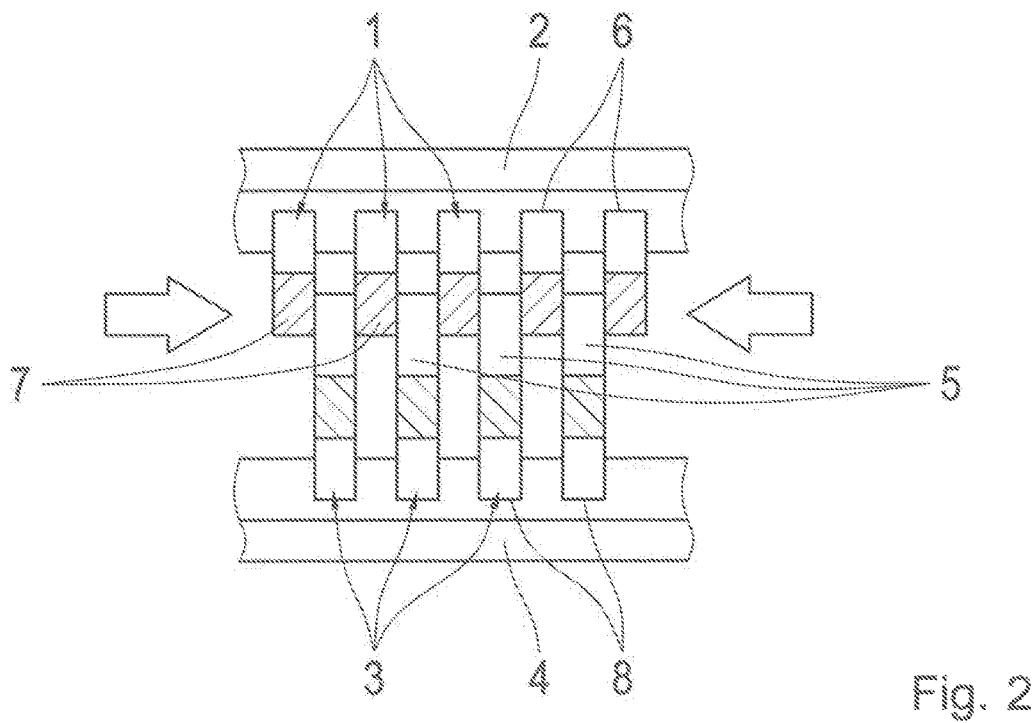

FIGS. 1 and 2 provide an embodiment, in which the first friction elements 1 are the external disks, and the second friction elements 3 are the internal disks, and each external disk, which is approximately annular, has an external synchronized gear tooth system 6 for connecting to the external multi-disk carrier 2 and an approximately annular friction surface 7. The internal disk, i.e., the second friction element 3, has an internal synchronized gear tooth system 8 for connecting to the internal multi-disk carrier 4 and a plurality of friction surface elements 5, which protrude radially outwardly, are distributed over the circumference and are in overlap with the annular friction surface 7 of the external disk.

Figure 3:
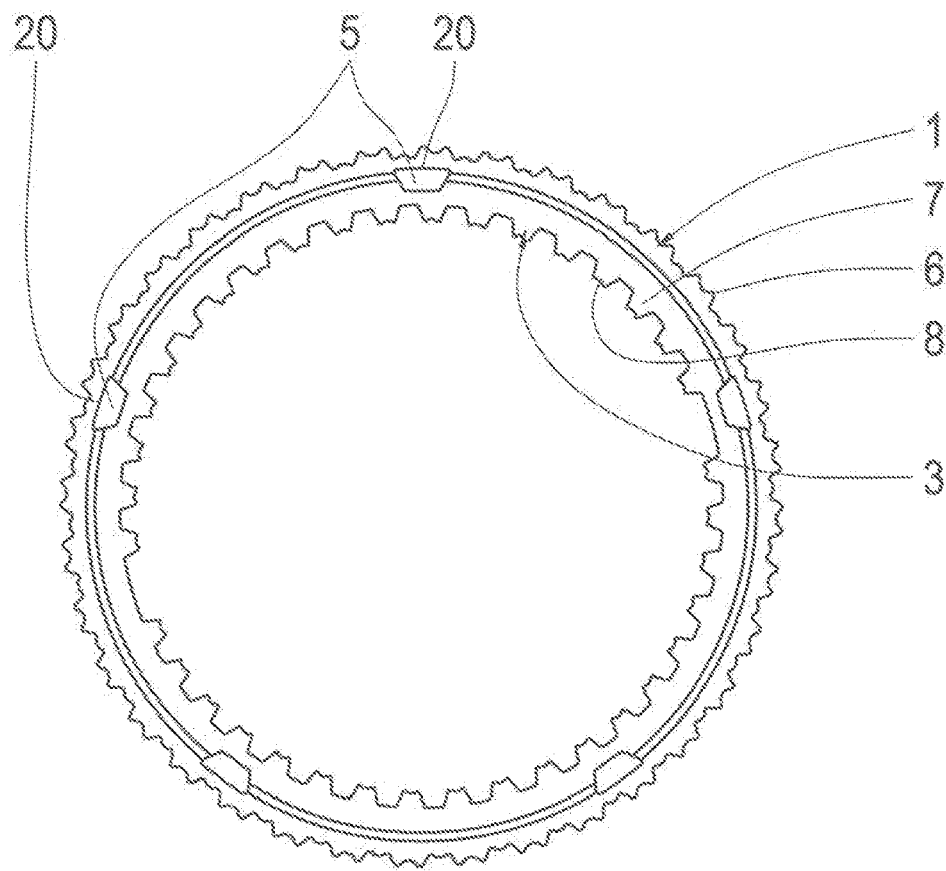
FIGS. 3 and 4 show several views of a part of the frictional shift element with a friction element, as an external disk, with a plurality of friction surface elements projecting radially inwardly.
Figure 4:
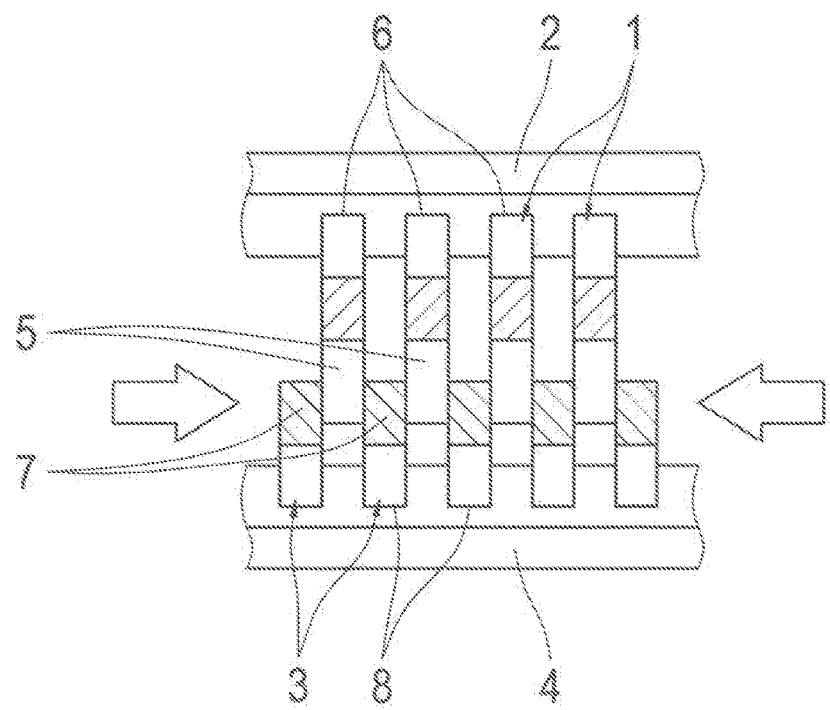

In contrast to the embodiment shown in FIGS. 1 and 2, the embodiment, shown in FIGS. 3 and 4, provides that the friction surface elements 5 are provided on the first friction elements 1, which are the external disks, and the annular friction surface 7 is provided on the second friction elements 3, which are the internal disks. The friction surface elements 5 are arranged such that they protrude radially inwardly, are distributed over the circumference, and are in overlap with the annular friction surface 7. The arrows to the multi-disk pack, shown in FIGS. 2 and 4, illustrate the acting axial forces for engaging the frictional shift element of the invention.

Independently of the two embodiments in accordance with FIGS. 1 to 4, it is provided that the first and second friction elements 1, 3, which can be brought into frictional engagement with each other, are spaced apart from each other in the radial direction, irrespective of the protruding friction surface elements 5.

The friction surface elements 5, shown in FIGS. 1 to 27, are welded to the first or second friction elements 1, 3, so that a plurality of separate tooth-shaped friction surfaces or rather contact surfaces are provided in the circumferential direction; and in the engaged state of the frictional shift element, these surfaces can be brought into contact with the approximately annular friction surface 7. The friction surface elements 5 are optimizable with respect to length and width ratio, angle, edge shape and surface structure, in order to create a frictional shift element that is manufactured as cost effectively as possible and exhibits a low drag torque.

Figure 5:
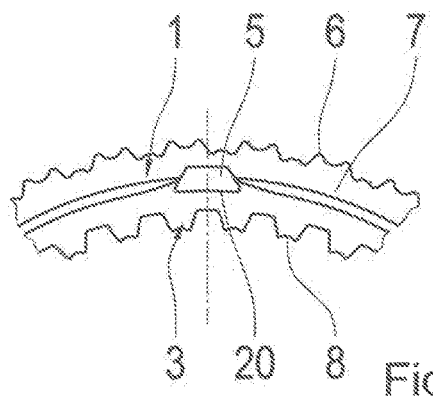
FIGS. 5 and 5A show several views of a part of a friction surface element that is formed on an internal disk over multiple radii.
Figure 5A:
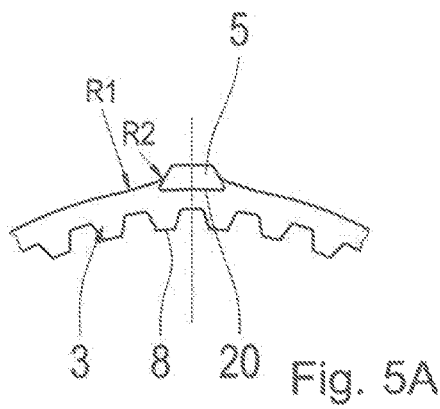

FIGS. 5 and 5A show detailed views of the friction surface element 5, which is welded to the base body of the second friction element 3, based on the embodiment in accordance with FIGS. 1 and 2. In order to increase the mechanical strength of the friction element 3, which is designed in multiple pieces with the friction surface element 5, it is provided that the annular cross section is enlarged in the direction of the friction surface element 5. This means that in the embodiment shown in FIGS. 5 and 5A, the outer circumference of the approximately annular friction element 3 is enlarged in the area of the friction surface element 5 that is formed thereon. In FIG. 5A the tooth-shaped friction surface element 5 is formed on the annular friction element 3 over different radii R1, R2 located one behind the other. The radius in the area of the outer circumference of the annular base body of the friction element 3 is larger than it is at the end of the tooth-shaped friction surface of the friction surface element 5. In this way the transition from the protruding friction surface element 5 to the base body is optimized with respect to its stress distribution. The annular cross section is enlarged in the direction of the friction surface element 5, so that the entire multi-disk pack may be more compact in the radial direction. As a result, during transmission of power, the friction surface element 5 introduces a bending moment into the annular geometry. In order to optimize the resulting stress distribution on the friction element 3, it is advisable to initially begin the curvature, starting from the annular geometry, with a larger radius R1 (long arrow) and then to continue with a smaller radius R2 (short arrow) in the direction of the friction surface element 5. The geometric shape or rather the course of the radii on the friction surface element 5 is presentable in different ways on both sides of the friction tooth or, more specifically, the friction surface element 5 (preferred direction of rotation).

Figure 6:
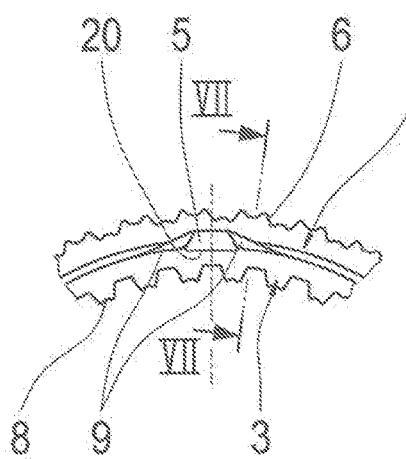
FIGS. 6 and 7 show several views of a part of the frictional shift element with rib-shaped reinforcements, provided on both sides in the circumferential direction, on the friction surface element.
Figure 7:

FIG. 6 is a side view of a part of the frictional shift element, and FIG. 7 is a view cut along the section line VII of FIG. 6. In the illustrated embodiment a rib-shaped reinforcement 9 is formed on both sides of the friction surface element 5 in the circumferential direction. As a result, an area with reduced disk width or thickness is located adjacent to the area of the outwardly protruding friction surface element 5, in order to achieve an increase in strength without enlarging the friction surface of the friction surface element 5. The reduced disk width may be produced by forming technology, for example, as a chamfer, next to the actual friction surfaces of the friction surface element 5. The rib that is formed in this way mechanically supports the friction surface element 5. This gain in strength also makes it possible to design the multi-disk pack more compactly. This feature is also cost effective and increases the material strength and strain hardening.

Figure 8:
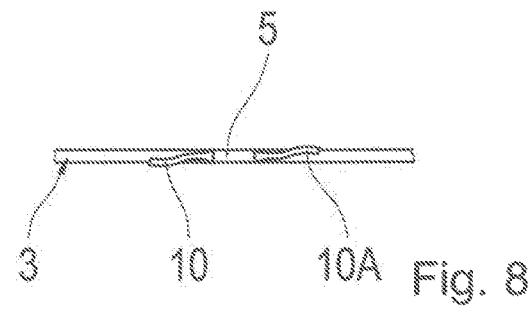
FIGS. 8 to 16 show various views of a part of the frictional shift element with spring clip elements, formed on the friction surface element in the circumferential direction, for the forced distancing from adjacent friction elements.
Figure 9:
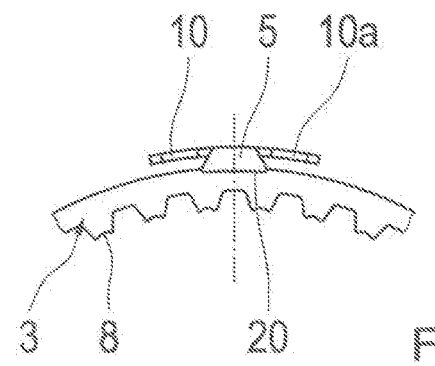
Figure 10:
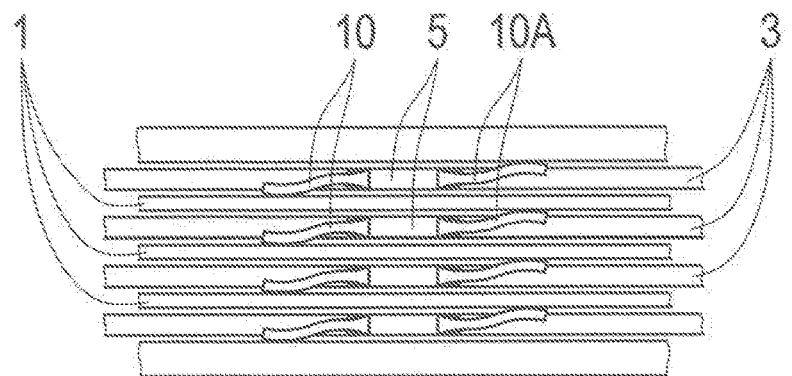
Figure 11:
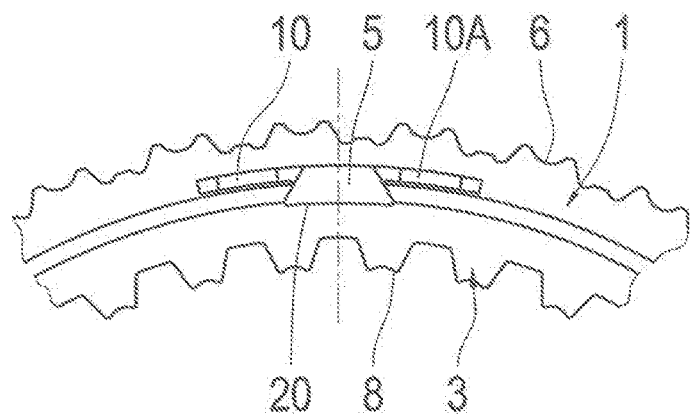
Figure 12:
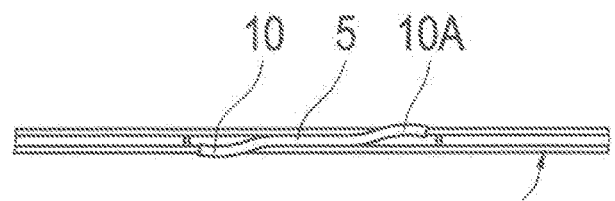

FIG. 8 is a plan view of a friction element 1, 3 provided with the friction surface element 5, wherein a spring clip element 10 and 10A is provided for forcibly distancing in the circumferential direction on both sides of the friction surface element 5.

As can be seen, in particular, in FIGS. 8, 10, 12 to 15, the spring clip elements 10, 10A are resilient in the axial direction of the respective friction element 1, 3, and, in the unactuated state of the frictional shift element, project in the axial direction from the friction surfaces of the friction element 1 or 3.

Preferably the spring clip elements 10, 10A are in one piece with the friction surface element 5, as can be seen, in particular, from FIGS. 9, 11, 14 and 16.

Preferably the spring clip elements 10, 10A are arranged on each friction surface element 5 so as to project in the axial direction opposite from the respective friction element 1, 3. In the case of a multi-disk pack consisting of a plurality of friction elements 1, 3, as shown, in particular, in FIGS. 10 and 15, the spring clip elements 10, 10A act on a friction element 1 or 3 in the axially opposite direction of the adjacent friction elements 1 or 3 of the same multi-disk carrier 2 or 4. The frictional shift element is disengaged in FIGS. 10 and 15; that is, the disks or, more specifically, the friction elements 1, 3 are in a vented state. It can be seen, how the spring clip elements 10, 10A hold the adjacent friction elements 1 at a distance. Owing to this secured spacing, the coolant and lubricating oil, flowing through the intermediate space, is less sheared, and as a result, produces lower drag torques.

Independently of the respective embodiments of the spring clip elements 10, 10A, the adjacent friction elements 1, 3 are held at a distance. In the loaded state, thus, in the engaged state of the frictional shift element, the spring clip elements 10, 10A are pushed together or away; and the actual friction surfaces come into contact. In order to ensure that the forced distancing functions particularly well, the spring clip elements 10, 10A are thinner than the friction elements 1, 3 or the friction surface elements 5. Ideally a plurality of such spring clip elements 10, 10A is arranged so as to be distributed over the periphery, in order to achieve a proper separation of the friction elements 1, 3 in the vented state. The spring clip elements 10, 10A do not have to be necessarily secured, as shown here, on the friction surface elements 5. Moreover, drivers or the like are usable specifically for receiving the spring clip elements 10, 10A. In this case, the receptacle for the spring clip elements 10, 10A is also thinner than the rest of the friction element 1, 3.

The clearance, provided in the design of the entire multi-disk pack, may be greater than the sum of the spring deflections of the individual friction elements 1, 3. This means that when the frictional shift element is disengaged, it is quite likely that the spring clip elements 10, 10A can also be lifted. That is, they need not necessarily rub. This aspect is particularly relevant if the spring clip elements 10, 10A act at differential rotational speeds, thus, on friction elements 1, 3 of different carriers 2, 4.

Figure 13:
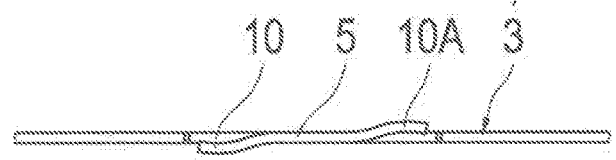
Figure 14:
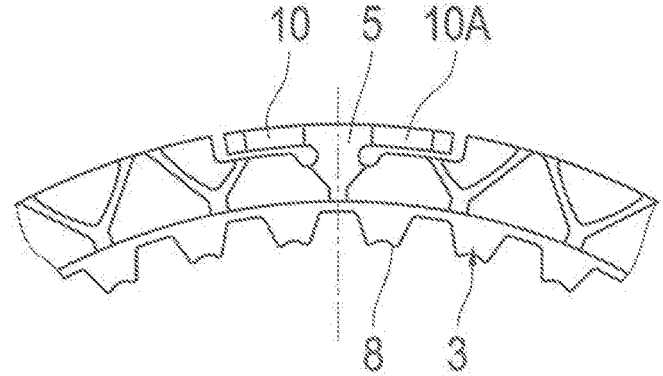
Figure 15:
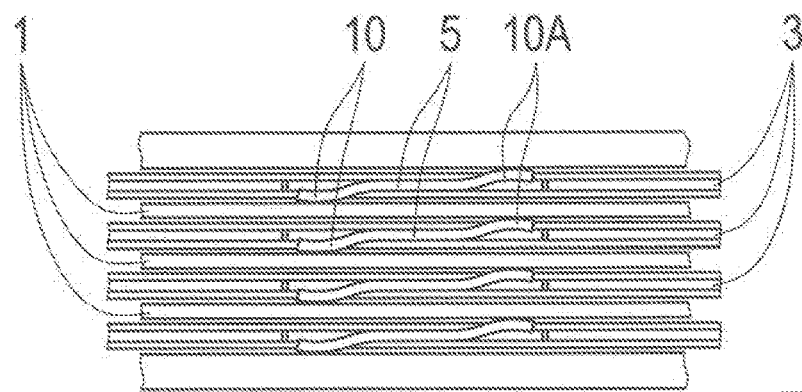
Figure 16:
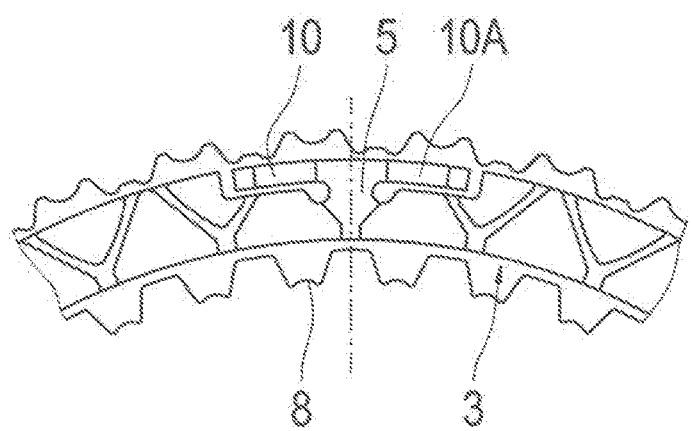

For example, FIGS. 12, 14, 15 and 16 show the friction element 3 as a lining disk with a friction lining, for example, a paper lining or the like. In contrast, FIG. 13 shows the friction element 3 without a friction lining.

Figure 17:
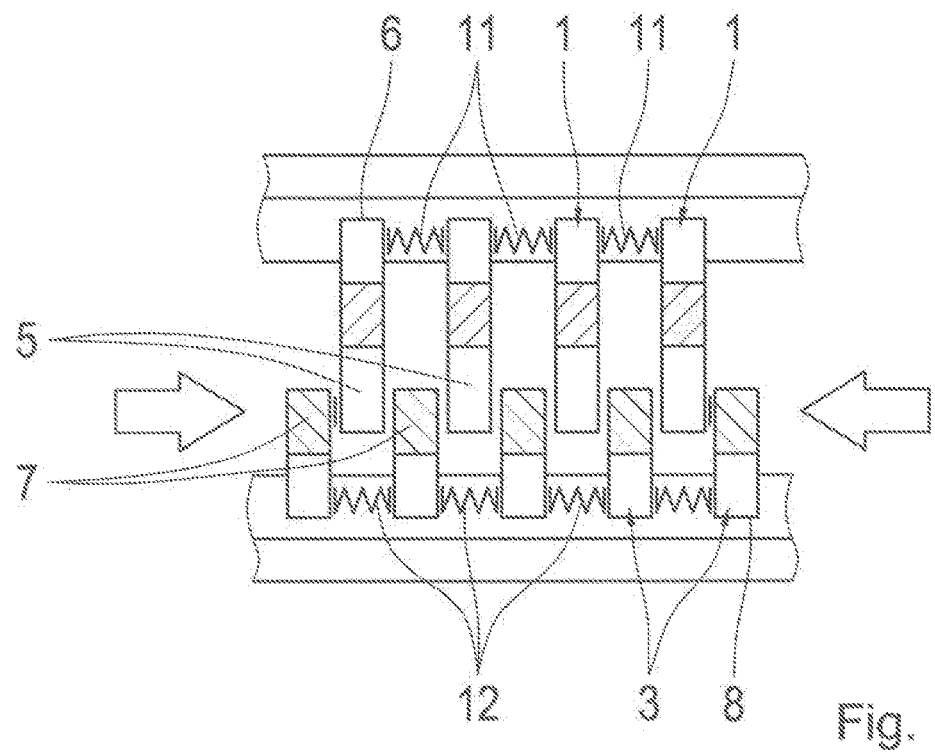
FIG. 17 shows a schematic view of the frictional shift element as a multi-disk pack with friction elements, forced-distanced by a spring element in the area of the respective synchronized gear tooth system.

An additional option of forced distancing is shown in FIG. 17. In this embodiment the friction elements 1, 3 of the same multi-disk carrier 2, 4 are forcibly distanced in the area of the respective synchronized gear tooth system 6, 8 by individual spring elements 11, 12, wherein the spring elements 11, 12 are merely indicated. However, said springs may be not only springs, but they may also be spring plates or the like. The spring elements 11, 12 act on the disks or, more specifically, the friction elements 1, 3, which are associated, for example, with the same multi-disk carrier 2, 4. Thus, a differential rotational speed is not applied between the friction elements 1, 3. The friction elements 1, 3 of the respective carrier 2, 4 are distanced from each other by the spring elements 11, 12; and the friction elements 1, 3 of the different carriers 2, 4 are spaced apart from each other only at two friction points. In this way it is ensured that a defined air gap is provided, and only negligibly small drag torques occur in the disengaged state of the shift element. Thus, in the embodiment shown in FIG. 17, the multi-disk pack, consisting of internal disks and external disks, is aligned centrally to one another.

FIGS. 18 to 21 show various embodiments of the frictional shift element, which makes possible a higher degree of mechanical strength and a greater reduction in the amount of installation space required in the axial direction. Furthermore, better heat dissipation and a lower axial contact force are achieved; and, in addition, a lower degree of forming the friction elements 1, 3 during production is made possible.

Figure 18:
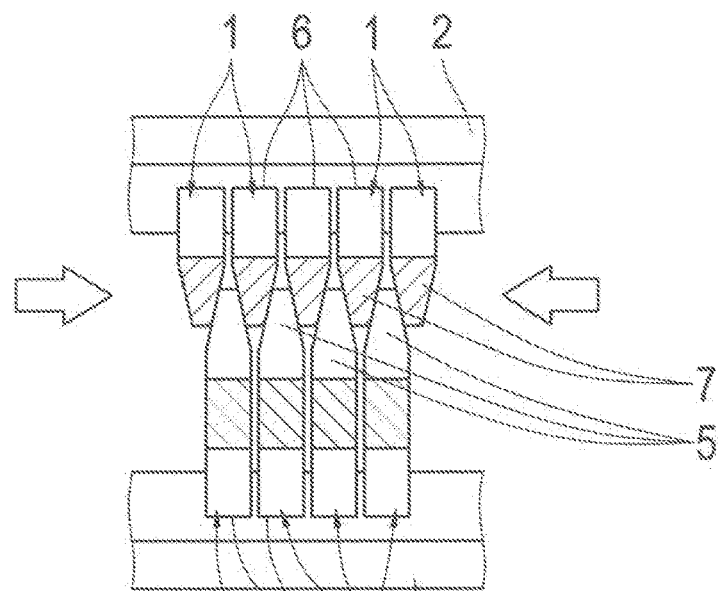
FIG. 18 shows a schematic view of the frictional shift element as a multi-disk pack with friction elements that are beveled at the corresponding friction surfaces and, thus, cone shaped.

FIG. 18 shows a frictional shift element, in which the respective adjacent first and second friction elements 1, 3 on the friction surface elements, which face each other, are beveled or conical in the cross section. In particular, owing to the cone effect, lower axial contact forces are required. In this embodiment the axial tapering of the friction surface elements 5 and the friction surfaces 7 are symmetrical. An asymmetrical or unilateral flattening is also possible.

Figure 19:
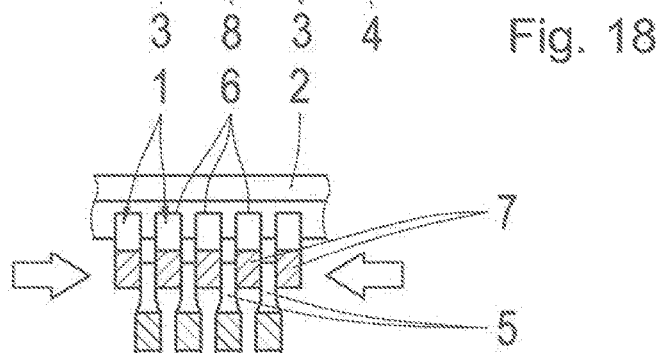
FIG. 19 shows a schematic view of the frictional shift element as a multi-disk pack with friction elements having a smaller axial thickness in the area of the friction surface elements.

FIG. 19 shows a frictional shift element, in which the friction surface element 5 has a smaller thickness in the axial direction than in the area of the synchronized gear tooth system 8 of the second friction element 3. In this embodiment the tapering of the friction surface elements 5 is symmetrical. An asymmetrical or unilateral flattening is also possible.

Figure 20:
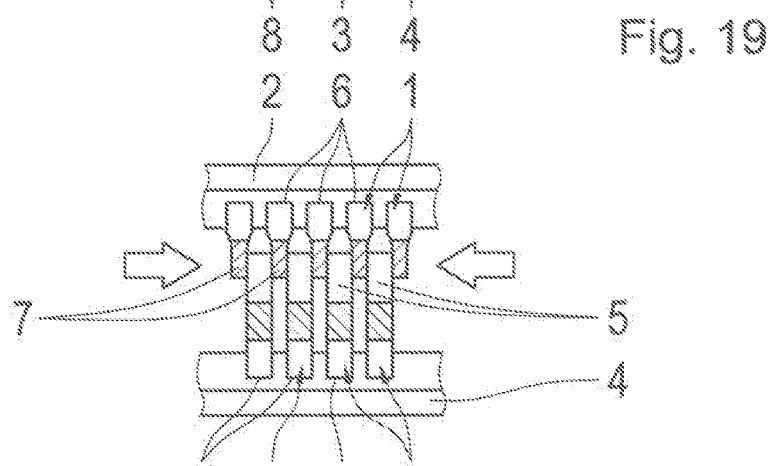
FIG. 20 shows a schematic view of the frictional shift element as a multi-disk pack with friction elements having a smaller axial thickness in the area of the annular friction surfaces.

FIG. 20 shows the frictional shift element, in which the first friction elements 1 in the area of the annular friction surfaces 7 have a smaller thickness in the axial direction than in the area of the synchronized gear tooth system 6, where in this case the friction surface elements 5 have an unchanged thickness. In this embodiment the tapering of the annular friction surfaces 7 is symmetrical. It is also possible that an asymmetrical or unilateral flattening is provided.

Figure 21:
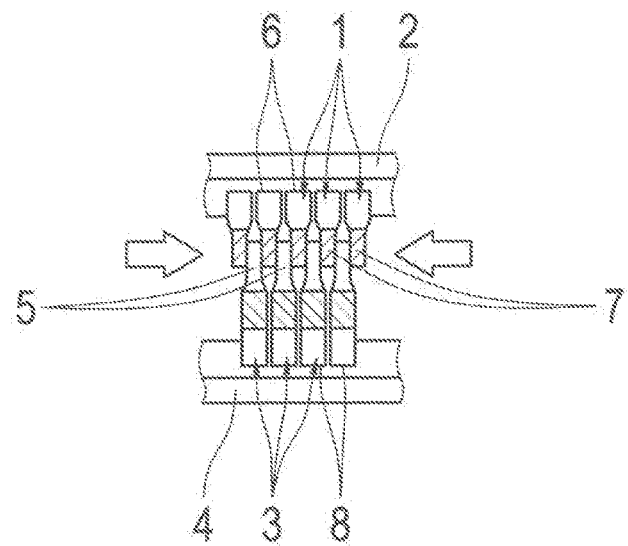
FIG. 21 shows a schematic view of the frictional shift element as a multi-disk pack with friction elements having a smaller axial thickness in the area of the annular friction surfaces and in the area of the friction surface element.

FIG. 21 shows an embodiment, in which the embodiments, shown in FIGS. 19 and 20, are combined.

Figure 22:
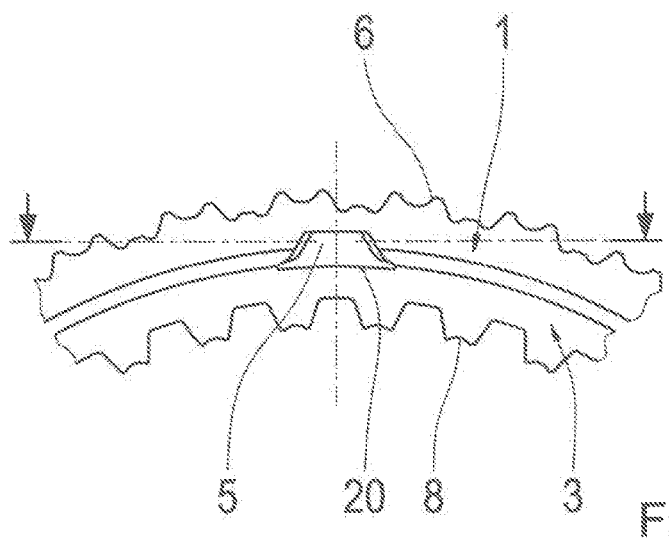
FIGS. 22 and 23 show multiple detailed views of the frictional shift element with friction surface elements having chamfers or radii in the circumferential direction in the inlet and outlet areas.
Figure 23:
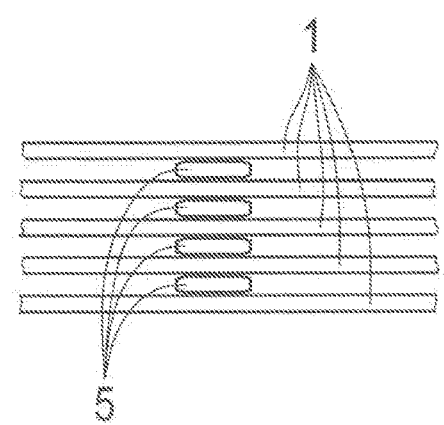

FIGS. 22 and 23 show various detailed views of the frictional shift element, in which chamfers or radii are provided on the friction surface element 5 in the circumferential direction at the inlet and outlet areas. Thus, the friction surface elements 5 or, more specifically, the friction teeth have chamfers or radii in their inlet and outlet areas, in order to protect the adjacent friction element. This arrangement prevents the friction surface element 5 from sliding almost like a turning tool in a machining manner across the friction partner. In addition, this arrangement may also reduce the drag torque.

Figure 24:
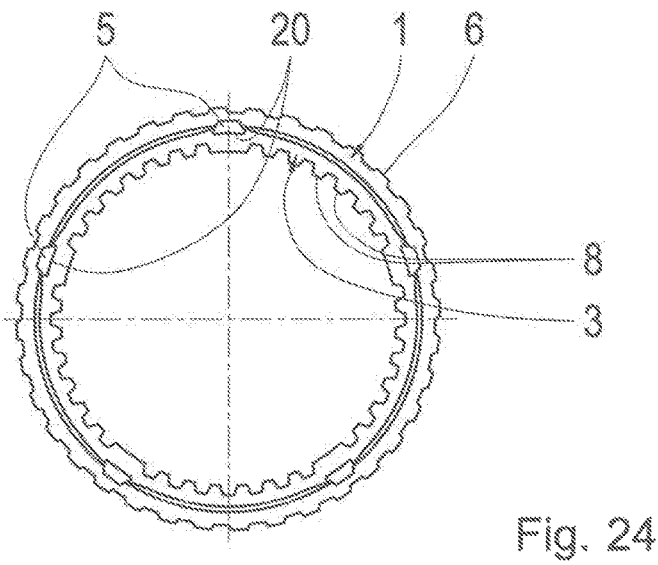
FIG. 24 shows a schematic view of the frictional shift element as a multi-disk pack with friction elements, mounted on a common carrier, with friction surface elements, arranged congruently one behind the other in the axial direction.

FIG. 24 shows the proposed frictional shift element with an assembly aid, which provides that the friction surface elements 5 are arranged on the friction elements 3 of the internal multi-disk carrier 4 in the axial direction congruently one behind the other. When assembling the friction elements 1 or 3, it is essential to ensure that the friction surface elements 5 or, more specifically, the teeth are arranged congruently one behind the other in the axial direction. For this reason, the friction elements 1, 3 have synchronized gear tooth systems 6, 8 with different geometries at the individual teeth or tooth gaps. At this point an assembly device, corresponding to the synchronized gear tooth system 3, may ensure an assembly in a desired rotational position. In this figure the friction elements 1, 3 are also mirror image symmetrical. Mirror image symmetrical means that during assembly, which side is pointing upwards and which side is pointing downwards is irrelevant. This feature reduces the possibility of an incorrect assembly.

Inside the synchronized gear tooth system 6, 8, there are different geometries, such as, for example, different tooth widths and/or different tooth gap widths and/or different tooth angles, in order to force, in combination with a corresponding carrier 2, 4, an assembly with the friction surface elements 5 arranged congruently one on top of the other in the axial direction.

Figure 25:
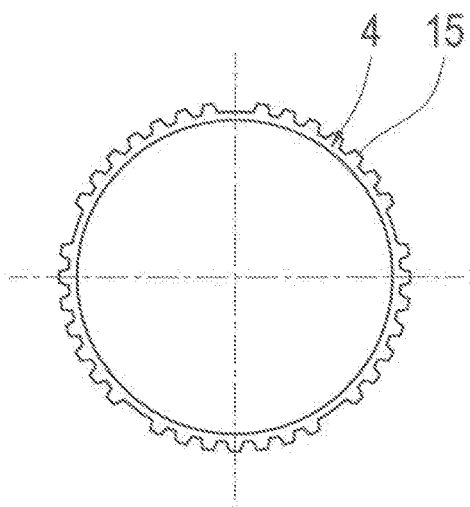
FIG. 25 shows a schematic view of an internal multi-disk carrier, receiving an internal friction element shown in FIG. 24 in a rotationally rigid manner, with adapted synchronized gear tooth system.

As shown in FIG. 25, the multi-disk carrier 4 has a geometry, which matches the friction element 3, in its synchronized gear tooth system 15, so that an assembly at an incorrect angle of rotation can be ruled out.

Figure 26:
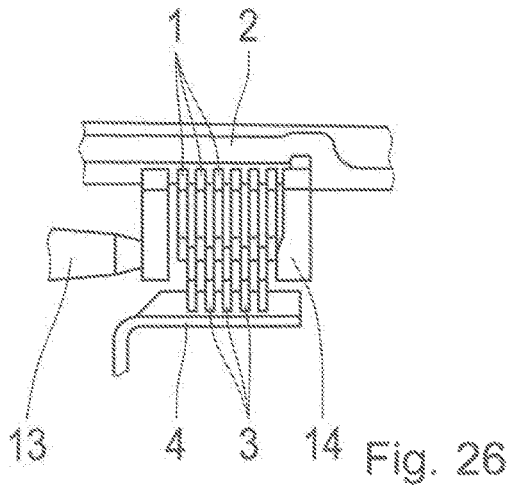
FIGS. 26 and 27 show in schematic form various views of a part of the frictional shift element as a multi-disk pack with a support element, which is provided at the end of the multi-disk pack and is spaced apart from the central friction surface radius outwards in the axial direction.
Figure 27:
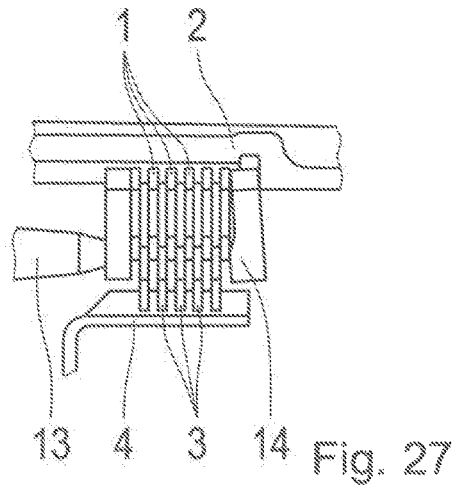

In FIGS. 26 and 27, the proposed frictional shift element is depicted with a corresponding multi-disk pack, consisting of the first friction elements 1 and the second friction elements 3, where in this case the multi-disk pack is vented or rather disengaged in FIG. 26 and is engaged or shifted in FIG. 27. The piston 13 for actuating the frictional shift element and for generating the necessary axial force is correspondingly actuated, so that the axial force is applied to the multi-disk pack. The force is passed through the multi-disk pack and is fed back to the last friction element 1 into the multi-disk carrier 2. This may cause the edge of the last friction element 1 to curve convexly. In order to achieve, independently of the convexly curved shape, an even wear pattern on the friction surfaces, it is proposed that at least one support element 14 be arranged at the beginning and/or end, in the drawing according to FIGS. 26 and 27, at the end of the friction element pack or, more specifically, the multi-disk pack and be spaced apart from the central friction surface radius of the corresponding friction surfaces of the friction elements outwards or inwards, in the embodiments shown, outwards, in the axial direction.

FIGS. 28 to 38 show various additional embodiments of the frictional shift element according to the invention. In particular, these figures show enlarged views of the friction elements and the friction surface elements of the frictional shift element according to the invention.

Figure 28:
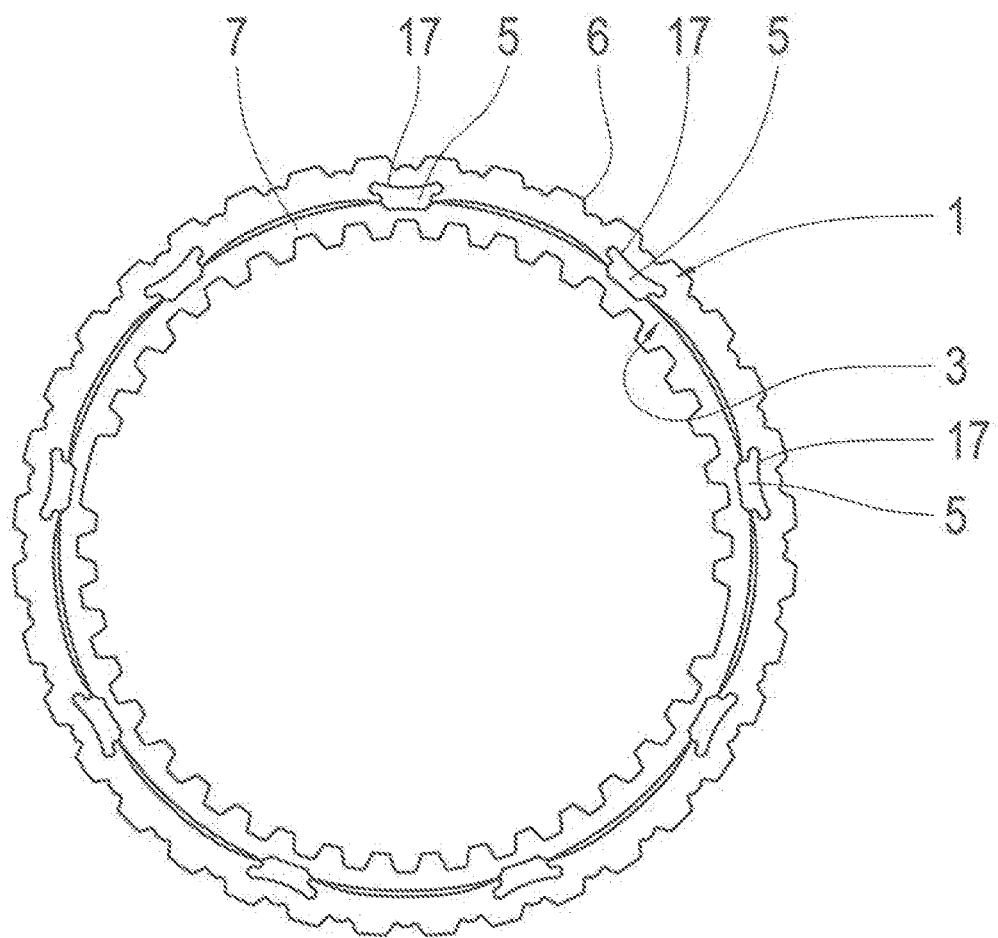
FIG. 28 shows an axial front view of a pair of external/internal disks of frictional shift element of the invention, with said pair of external/internal disks being aligned coaxially to each other.

FIG. 28 shows a pair of external/internal disks 1 or 3 that are aligned coaxially to each other. Nine friction surface elements 5 are inserted into the respective joining points 16 along a joint line 17 and protrude radially inwardly into the overlap area. The joint line 17 defines the joining point 16 in the circumferential and radial directions.

Of course, any other number of friction surface elements is also possible. In addition, the shape of the friction surface elements (length/width ratio, angle, edge shape, surface structure) may be freely optimized.

Figure 29:
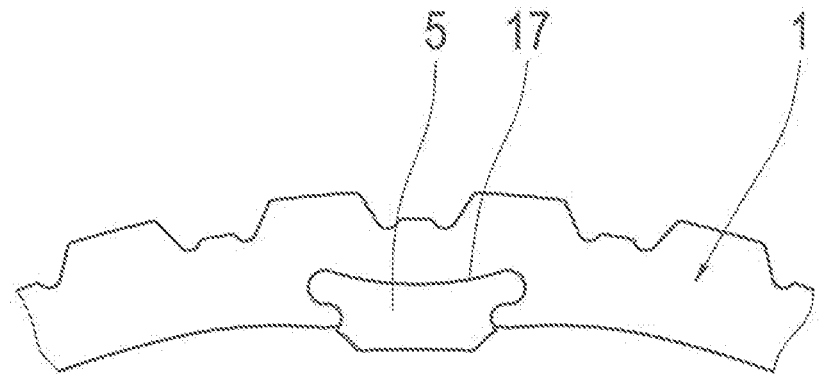
FIG. 29 shows an enlarged detail of the inventive friction element with inserted friction surface element.

FIG. 29 shows an enlarged detail of a friction element 1 with inserted friction surface element 5 of the frictional shift element according to the invention. The friction surface element is held by a back taper 18 along the joint line 17 in an essentially form-fitting manner, as known, for example, from puzzle pieces.

Figure 30:
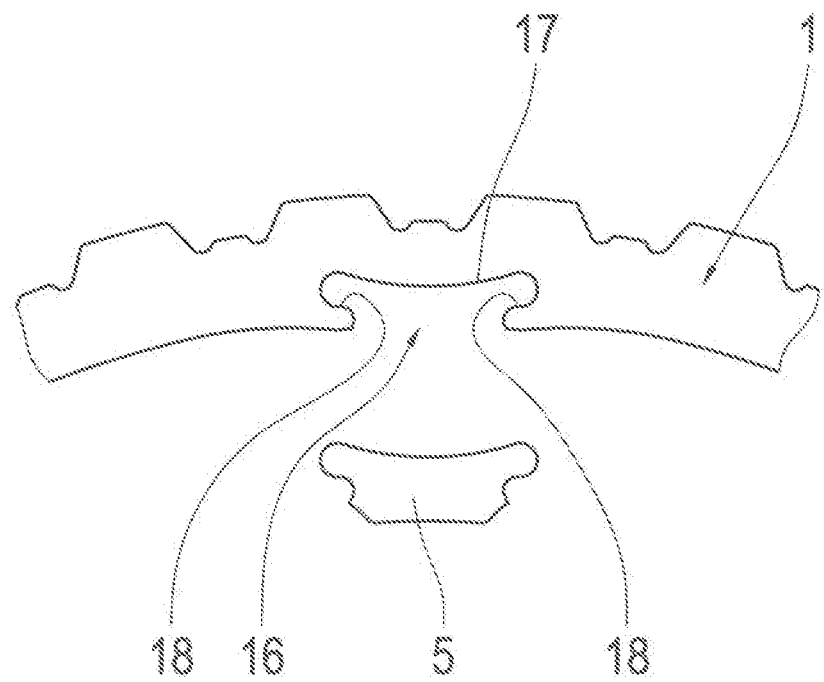
FIG. 30 shows the friction element and the friction surface element from FIG. 28 in a non-inserted state.

FIG. 30 shows the friction element and the friction surface element from FIG. 29 in a non-inserted state.

Figure 31:
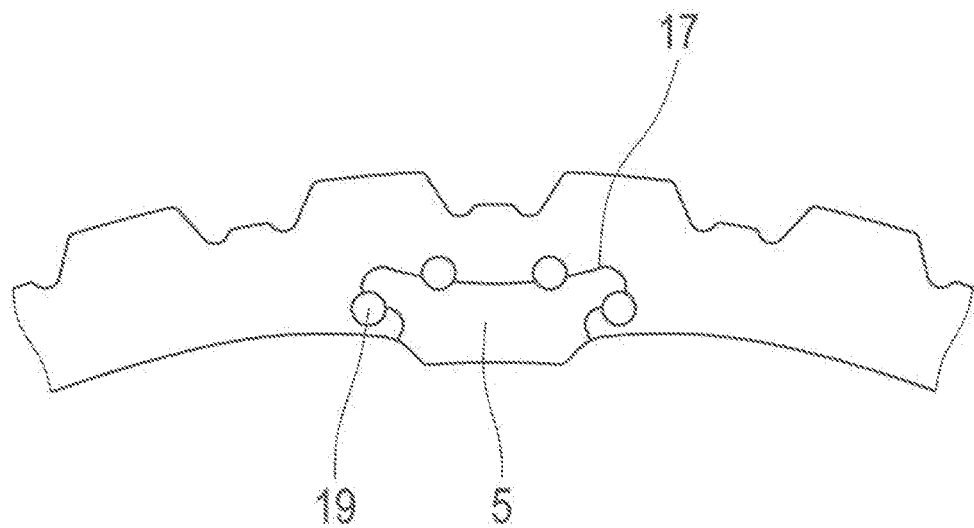
FIG. 31 shows the inserted friction surface element from FIG. 29 that is additionally fixed by fixing means along a joining point.

FIG. 31 shows the inserted friction surface element 5 from FIG. 29, which is also secured at the joining point 16 by four fixing means 19. In this case a forming process has been carried out at four points along the joint line 17 either at the friction element 1 and/or at the friction surface element 5, in order to secure the friction surface elements 5 against falling out laterally.

Figure 32:
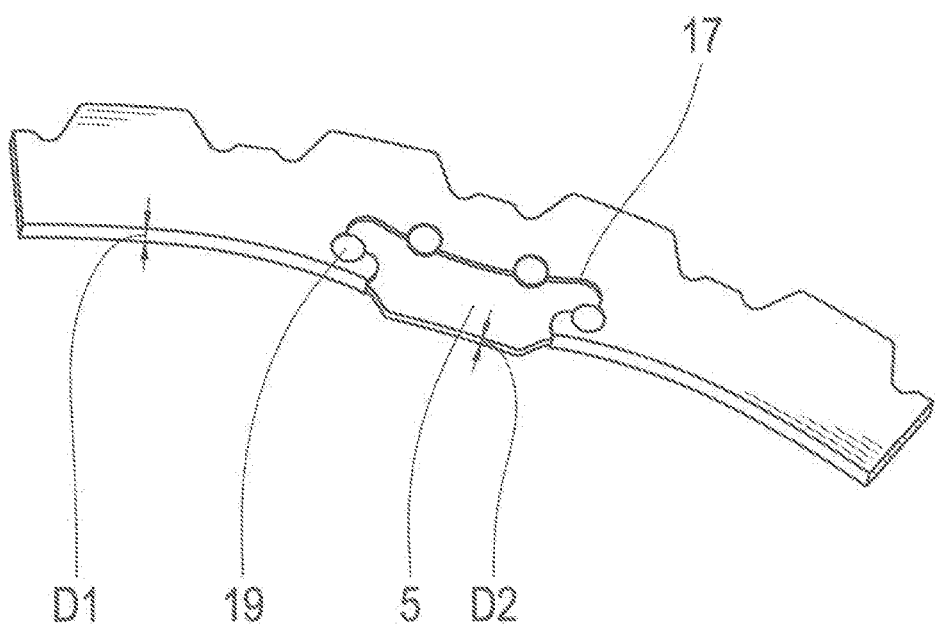
FIG. 32 shows the inserted friction surface element from FIG. 31 with fixing means in a perspective view.

FIG. 32 shows the inserted friction surface element from FIG. 31 in a perspective view. The friction surface element 5 has a thinner thickness D2 than the external disk 1 having a thickness D1. This feature simplifies the fixing by the forming process. In this case the forming is shown only point by point, i.e., locally, but could also be carried out along the entire joint line.

Figure 33:
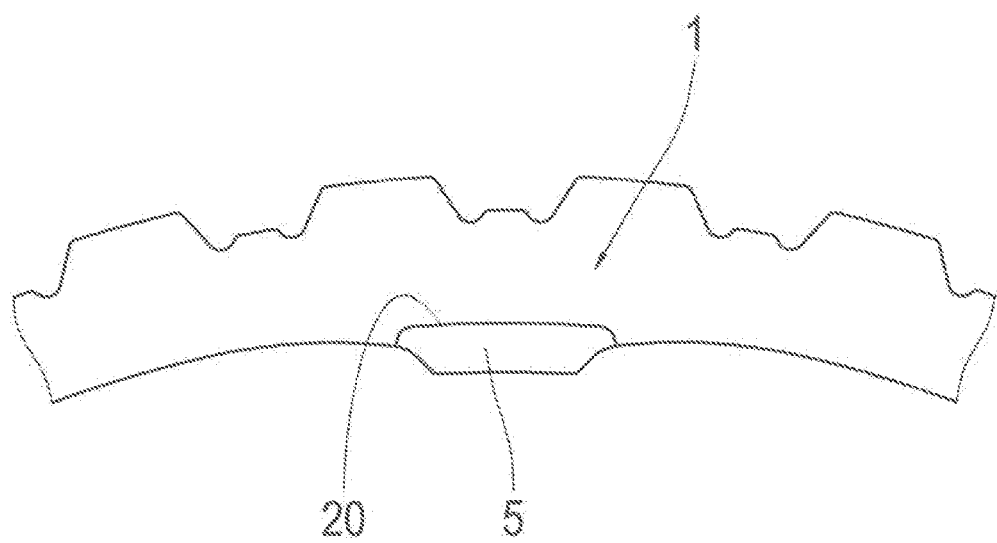
FIG. 33 shows an enlarged detail of the inventive friction element with welded-on friction surface element.

FIG. 33 shows an enlarged detail of the friction element of the inventive frictional shift element with the friction surface element 5 welded on. Then it is possible to dispense with the back taper 18.

Figure 34:
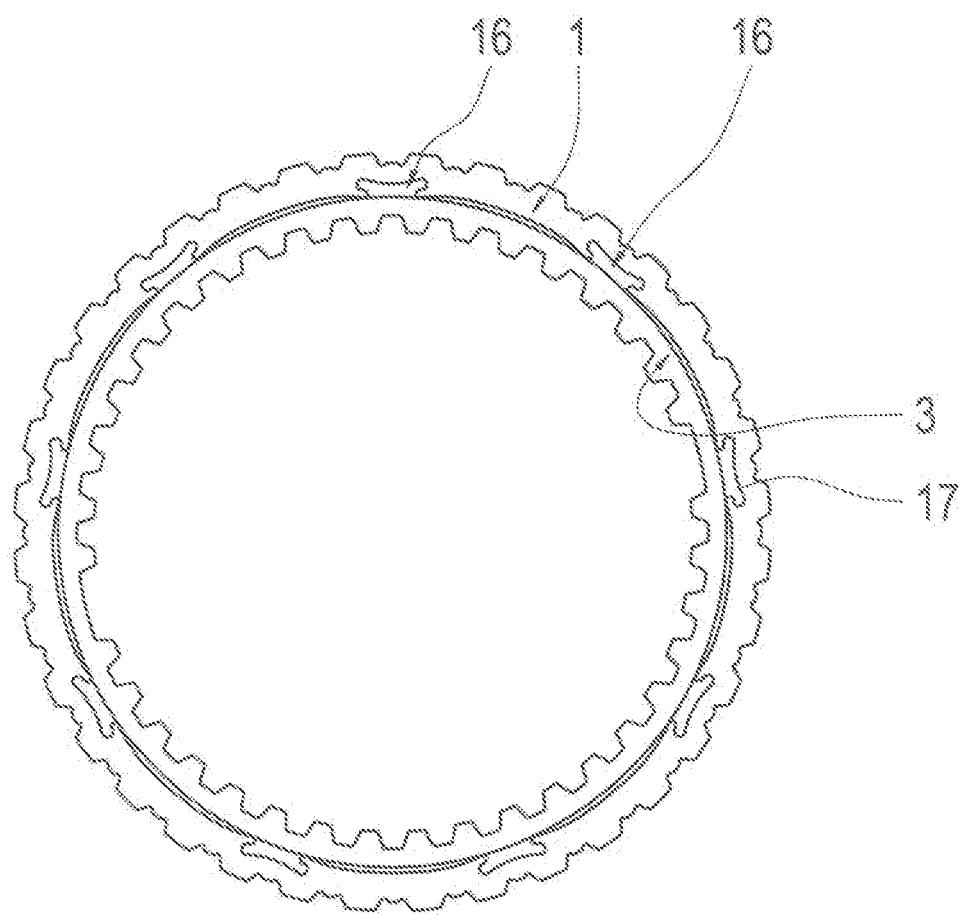
FIG. 34 shows the coaxially aligned pair of external/internal disks from FIG. 28 in a rear view.

FIG. 34 shows the pair of external/internal disks 1 or 3, which are coaxially aligned with each other, from FIG. 28 in a rear view, but without the friction surface elements 5. It can be seen very clearly, how the annular base bodies of the two disks 1, 3 are radially spaced apart from one another. This figure also shows that the internal disk 3 is made coaxial to the external disk 1, for example, by combination punching. Therefore, there will not be two internal parts to scrap. The friction surface elements 5 are joinable into the joining points 16.

Figure 35:
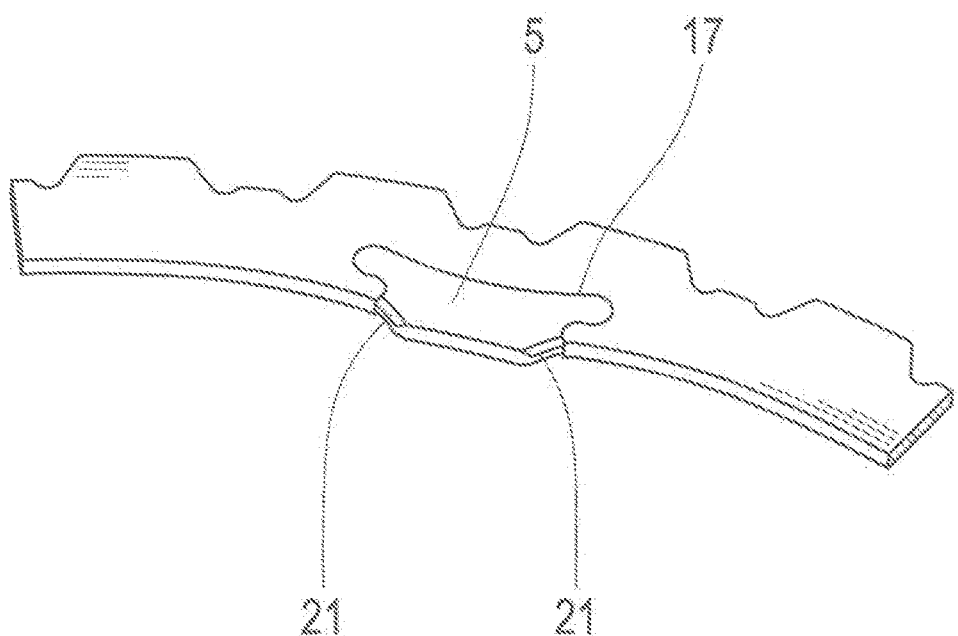
FIG. 35 shows an enlarged detail of the inventive friction surface element from FIG. 29 with chamfers.

FIG. 35 shows an enlarged detail of the inventive friction surface element from FIG. 29 with chamfers. These chamfers are milled into areas of an inlet and/or outlet zone. As a result, the drag torques are reduced even more.

Figure 36:
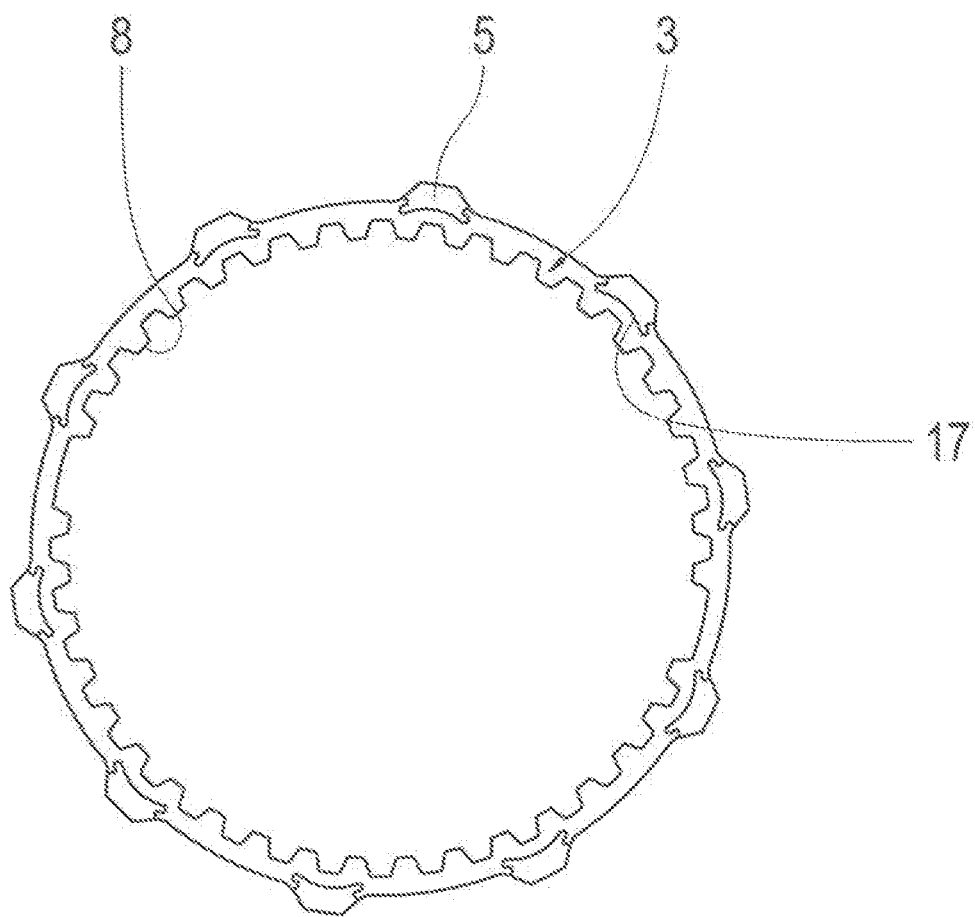
FIG. 36 shows an internal disk 3 of the inventive frictional shift element with inserted friction surface elements 5 protruding radially outwardly.

FIG. 36 shows an internal disk 3 of the inventive frictional shift element with friction surface elements 5 that protrude radially outwardly, where the friction surface elements are inserted and not welded on.

Figure 37:
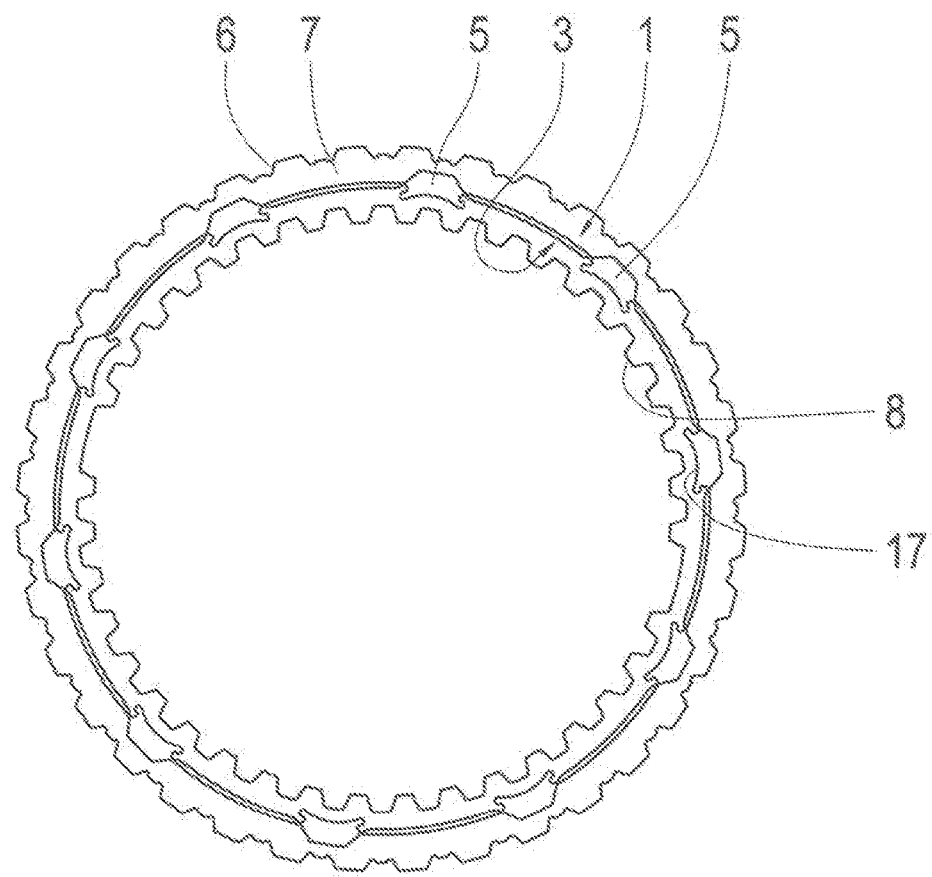
FIG. 37 shows an assembly of a pair of external/internal disks 1 or 3, which are aligned coaxially to each other, of the inventive frictional shift element with inserted friction surface elements (5) protruding radially outwardly.

FIG. 37 shows a pair of external/internal disks 1 or 3, which are coaxially aligned to each other, with friction surface elements 5 that protrude radially outwardly as in FIG. 1; but, in contrast to FIG. 1, the friction surface elements 5 are inserted and not welded on.

Figure 38:
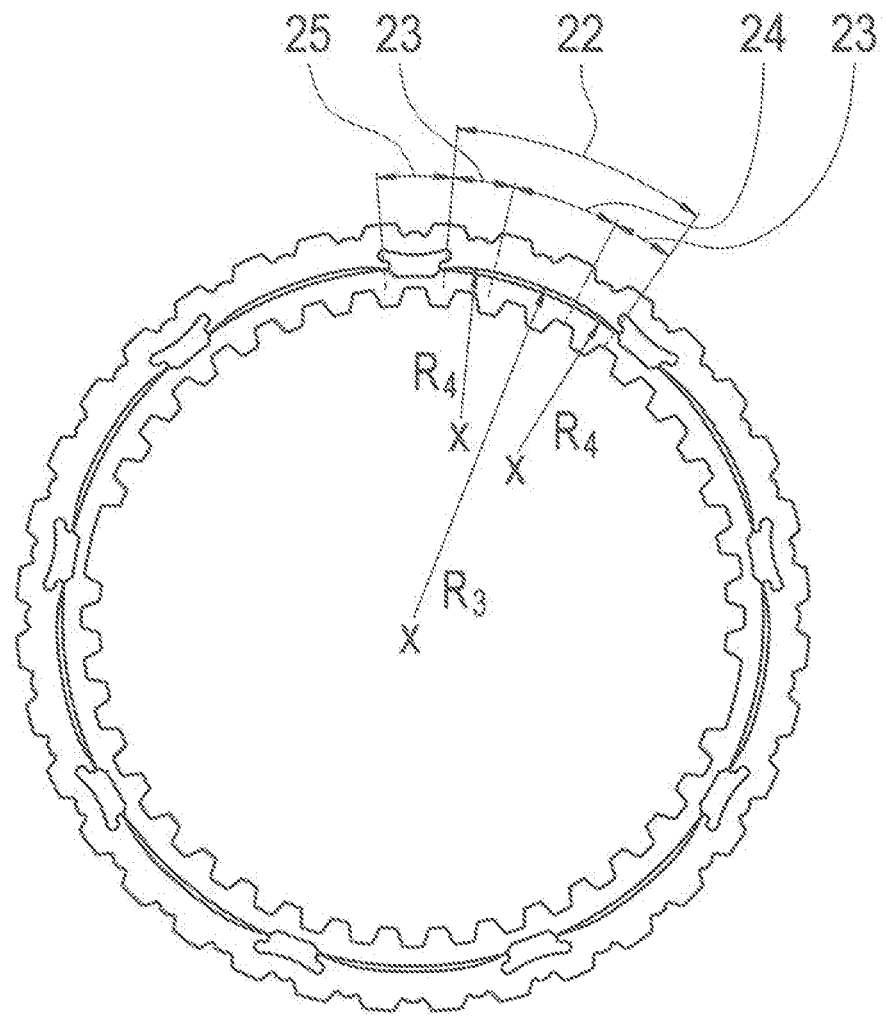
FIG. 38 shows a geometry of another preferred embodiment of the frictional shift element of the invention.

FIG. 38 shows a geometry of an embodiment of the invention. In this case the recesses, i.e., the joining points 16, and their immediate surroundings define the friction surface element zones 25. The respective intermediate zones 22 are arranged between the friction surface element zones 25 adjacent in the circumferential direction, wherein the respective intermediate zone 22 has a central zone 24 and two transition zones 23, enclosing the central zone 24, wherein said central zone 24 has a radius R3; and the respective transition zone 23 has a radius R4; and wherein each of the transition zones 23 is tangential to a central zone 24 and a friction surface element zone 25.

In this way the transition from the projecting friction surface element 5 to the base body is optimized with respect to its stress distribution in a manner similar to that already described with reference to FIG. 5*a*.

Figure 39:
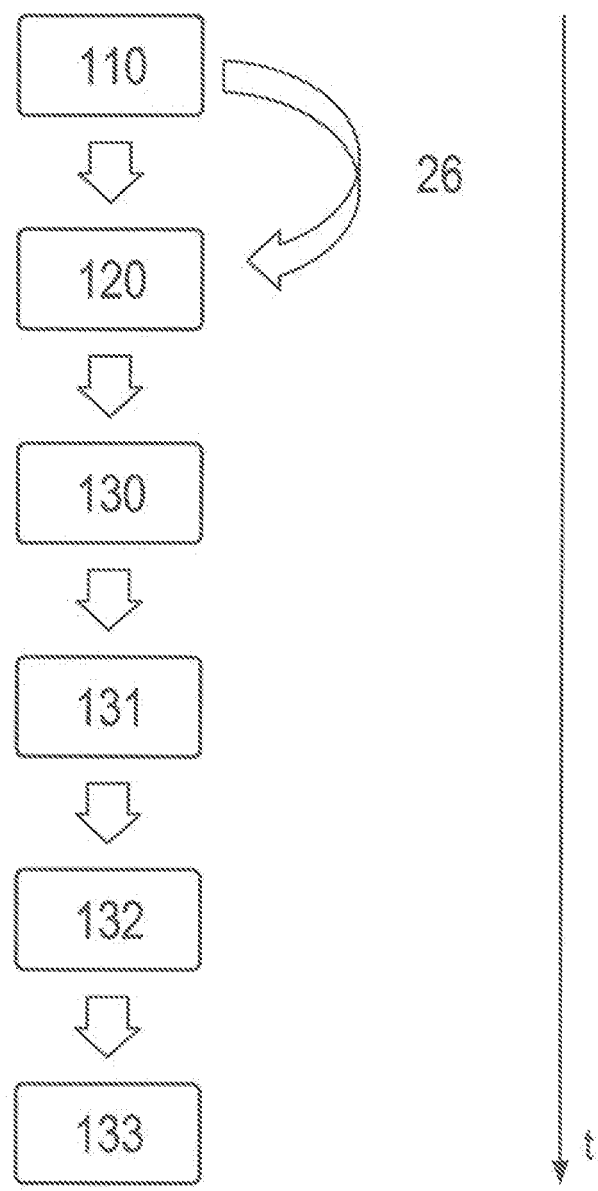
FIG. 39 shows an exemplary process of the inventive method for producing an inventive frictional shift element with inserted friction surface elements (5)

FIG. 39 (with inserted friction surface elements 5) and 40 (with welded-on friction surface elements 5) show an exemplary process of the inventive method for producing an inventive frictional shift element with a first and second friction element, wherein the friction element 3 is the friction element that receives the friction surface elements 5.

In FIG. 39 a friction element 3, as an internal disk, is punched initially out of a sheet metal strip in a first step 110. The results are punching waste 26, i.e., a sheet metal strip with a hole-shaped recess. In a temporally subsequent second step 120, a friction element 1, which is an external disk, is punched out of the punching waste 26. In this case the external disk 1 is punched coaxially to the hole-shaped recess. In a subsequent step 130 the recesses 16, as joining points, are punched with back tapers into the internal disk. In a subsequent step 131 the friction surface elements 5, which are friction teeth, are produced. In this case the friction teeth may be punched out of further punching waste 27 or also out of a different material. In a next step 132 the friction teeth 5 are inserted into the joining points 16. In a subsequent step 133 the friction teeth 5 are fixed by caulking to the internal disk 3 in the area of the joint line 16, so that a non-releasable positive and non-positive connection is produced.

For the person skilled in the art it is clear that the method, shown in FIG. 39, represents merely an exemplary method of the invention. It goes without saying that additional steps or fewer steps for manufacturing are conceivable, for example, steps for manufacturing the synchronized gear tooth system or, for example, because certain steps can take place simultaneously. Thus, it is, in particular, conceivable to carry out the steps 110 and 130 simultaneously. The recesses 16 may also be punched into the external disk. Then the friction teeth 5 would protrude correspondingly radially inwards. It is also conceivable to punch out the external disk first and then to punch the internal disk.

Figure 40:
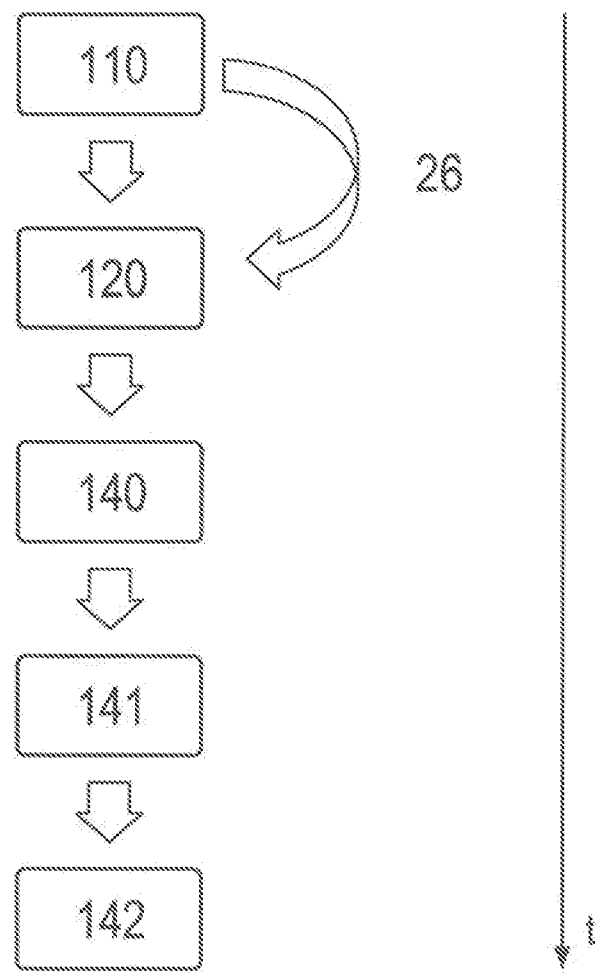
FIG. 40 shows an exemplary process of the inventive method for producing an inventive frictional shift element with welded-on friction surface elements (5).

The steps 110, 120 in FIG. 40 are identical to those in FIG. 39. In a step 140 following the step 120, the recesses 16 are punched into the internal disk without back tapers. Then in a subsequent step 141 the friction teeth 5 are produced. Subsequently in a step 142 the friction teeth 5 are welded to the recesses 16 that are provided for this purpose.

In this case, too, it is clear to the person skilled in the art that the method, shown in FIG. 40, represents merely an exemplary method of the invention. It goes without saying that additional steps, for example, steps for manufacturing the synchronized gear tooth system, or also fewer steps for manufacturing are conceivable. It is also possible to weld the friction teeth 5 to the recesses, punched into the external disk 1, so that they then protrude radially inwards. It is also conceivable to punch the external disk first and then to punch the internal disk.

In another embodiment, a frictional shift element for a transmission of a vehicle has at least one first friction element 1, associated with a first carrier 2, and with at least one second friction element 3, associated with a second carrier 4, as the friction partner. The first friction element 1 and second friction element 3 have overlapping friction surfaces, which can be brought into contact with each other for transmitting torque, wherein the first or the second friction element 1, 3 has a friction surface 7, which is approximately annular, and the respective other friction element 1, 3 has, as the corresponding friction surface, at least one friction surface element 5, which protrudes approximately radially into the overlap area.

In one embodiment of the frictional shift element, the first and second friction elements 1, 3, which can be brought into frictional engagement with each other, are spaced apart in the radial direction, irrespective of the at least one protruding friction surface element 5.

In a further embodiment of the frictional shift element, a plurality of friction surface elements 5 are arranged so as to be distributed over the periphery of an approximately annular base body of the first or second friction element 1, 3.

In another embodiment of the frictional shift element, the friction surface element 5 is formed as one piece on the first or second friction element 1, 3.

The frictional shift element of a further embodiment, wherein the first friction element 1 is the external disk; and the second friction element 3 is the internal disk, wherein the external disk, which is approximately annular, has an external synchronized gear tooth system 6, for connecting to the external multi-disk carrier 2, and an approximately annular friction surface 7, and wherein the internal disk has an internal synchronized gear tooth system 8 for connecting to the internal multi-disk carrier 4; and a plurality of fiction surface elements 5, which protrude radially outwardly, are distributed over the periphery and are in overlap with the annular friction surface 7 of the external disk.

The frictional shift element of another embodiment, wherein the first friction element 1 is the external disk; and the second friction element 3 is the internal disk, wherein the internal disk, which is approximately annular, has an internal synchronized gear tooth system 8, for connecting to the internal multi-disk carrier 4, and an approximately annular friction surface 7; and wherein the external disk has an external synchronized gear tooth system 6 for connecting to the external multi-disk carrier 2; and a plurality of friction surface elements 5, which protrude radially inwardly, are distributed over the periphery and are in overlap with the annular friction surface 7 of the internal disk.

In another embodiment of the frictional shift element, each friction surface element 5 is formed in an approximately tooth-shaped manner on the annular base of the friction element 1, 3. In one embodiment, the tooth-shaped friction surface element (5) is formed on the annular friction element 1, 3 over different radii R1, R2 that lie one behind the other. The radius R1 may be greater in the area of the inner or outer circumference of the annular base body than the radius R2 in the area of the tooth-shaped friction surface of the friction surface element 5.

In a further embodiment of the frictional shift element, a rib-shaped reinforcement 9 is formed on both sides of a friction surface element 5 in the circumferential direction.

In yet another embodiment of the frictional shift element, at least one friction surface element 5 in the circumferential direction has at least one spring clip element 10, 10A, which is resilient in the axial direction of the friction element 1, 3, for forcibly distancing the friction elements 1, 3 in the unactuated state of the frictional shift element. In one embodiment, the spring clip element 10, 10A is in one piece with the friction surface element 5. In another embodiment, spring clip elements 10, 10A are provided on both sides of at least one friction surface element 5 in the circumferential direction, wherein the spring clip elements 10, 10A are arranged so as to project in the axial direction opposite from the respective friction element 1, 3. The spring clip elements 10, 10A may act on a friction element 1, 3 opposite to the adjacent friction elements 1, 3 of the same carrier 2, 4.

In another embodiment of the frictional shift element, the friction elements 1, 3 of the same carrier 2, 4 are forcibly distanced by spring elements in the area of the respective synchronized gear tooth system 6, 8.

In a further embodiment of the frictional shift element, the respectively adjacent first and second friction elements 1, 3 are beveled or conical on the friction surfaces, which face each other.

In some embodiments of the frictional shift element, the friction surface element 5 has a smaller thickness in the axial direction than in the area of the synchronized gear tooth system 6, 8 of the respective friction element 1, 3.

In further embodiments of the frictional shift element, the friction element 1, 3 has a smaller thickness in the axial direction in the area of the annular friction surface 7 than in the area of the synchronized gear tooth system 6, 8.

In another embodiment of the frictional shift element, chamfers or radii are provided on the friction surface element 5 in the circumferential direction in the inlet and/or outlet area.

In a further embodiment of the frictional shift element, the friction surface elements 5 of the friction elements 1, 3 of a common carrier 2, 4 are arranged congruently one behind the other in the axial direction.

In another embodiment of the frictional shift element, inside a synchronized gear tooth system 6, 8, 15 different tooth widths and/or different tooth gap widths and/or different tooth angles are provided as an assembly aid, in order to arrange the friction surface elements 5 congruently in the axial direction.

For some embodiments of the frictional shift element, each friction element 1, 3 is mirror image symmetrical.

In the frictional shift element of some embodiments, at least one support element 14 is arranged, when seen axially, at the beginning and/or end of the multi-disk pack and is spaced apart from the central friction surface radius of the corresponding friction surfaces of the friction elements 1, 3 of the multi-disk pack outwardly or inwardly in the axial direction.

In one embodiment of the frictional shift element, a wet running frictional shift element is provided.

For a further embodiment of the frictional shift element, at least one of the first and/or second friction elements 1, 3 has at least one grooving in the area of the friction surface 7 and/or in the area of the friction surface element 5.

In a further embodiment of the frictional shift element, the friction elements 1, 3 are made of hardened steel and/or nitrocarburized steel.

The frictional shift element of another embodiment is used as a disengaging shift element in an automatic transmission.

Modifications and variations can be made to the embodiments illustrated or described herein without departing from the scope and spirit of the invention as set forth in the appended claims.

LIST OF REFERENCE NUMERALS AND SYMBOLS 1 first friction element or disk, external disk
2 first carrier
3 second friction element or disk, internal disk
4 second carrier
5 friction surface element, friction tooth
6 synchronized gear tooth system of the first friction element
7 annular friction surface
8 synchronized gear tooth system of the second friction element
9 rib-shaped reinforcement
10, 10A spring clip element
11 spring element
12 spring element
13 piston
14 support element
15 synchronized gear tooth system of the second carrier
16 recess, joining point
17 joint line
18 back taper, undercut
19 fixing means
20 weld
21 chamfers
22 intermediate zone
23 transition zone
24 central zone
25 friction surface element zone
26 punching waste
27 additional punching waste
110 punching of friction element 3
120 punching of friction element 1
130 punching of the joining points 16 with back taper 18
131 punching of the friction teeth 5
132 joining of the friction teeth 5 into the joining points 16
133 securing by caulking
140 punching of the joining points 16 without back taper
141 punching of the friction surface elements 5
142 welding of the friction teeth 5
D1 first thickness, friction element
D2 second thickness, friction surface element
R1, R2 radius
R3 radius central zone
R4 radius transition zone

The invention claimed is:

1. A frictional shift element for a transmission of a vehicle, comprising:
a first friction element (1); and
a second friction element (3),
wherein one friction element (1, 3) of the first friction element (1) and the second friction element (3) has a friction surface (7) that is approximately annular,
wherein the other friction element (1, 3) of the first friction element (1) and the second friction element (3) has an approximately annular base body and a plurality of friction surface elements (5), the plurality of friction surface elements (5) is distributed over a periphery of the approximately annular base body,
wherein the friction surface (7) and the plurality of friction surface elements (5) are configured to be brought into contact with each other in an overlap area for transmitting torque,
wherein the friction surface elements (5) protrude radially into the overlap area,
wherein the one friction element (1, 3) with the friction surface (7), the other friction element (1, 3), and the friction surface elements (5) are each formed as one piece; and
wherein the one friction element (1, 3) and the approximately annular base body of the other friction element (1, 3) are spaced radially apart from each other.

2. The frictional shift element of claim 1, wherein the other friction element (1, 3) has a plurality of recesses (16), and each friction surface element of the plurality of the friction surface elements (5) is received in a respective recess of the recesses (16).

3. The frictional shift element of claim 2, wherein the plurality of recesses (16) of the other friction element (1, 3) are distributed on the approximately annular base body along an inner circumference or an outer circumference of the approximately annular base body.

4. The frictional shift element of claim 1, wherein each of the plurality of friction surface elements (5) is shaped on the other friction element (1, 3) over various sequential radii (R1, R2).

5. The frictional shift element of claim 1, wherein each of the plurality of friction surface elements (5) is fixed by a respective fixing means to the other friction element (1, 3).

6. The frictional shift element of claim 5, wherein each of the plurality of friction surface elements (5) is fixed on the other friction element (1, 3) at least point by point along a respective joint line (17).

7. The frictional shift element of claim 1, wherein the plurality of friction surface elements (5) is welded to the other friction element (1, 3).

8. The frictional shift element of claim 1, wherein the other friction element (1, 3) has at least a first thickness D1 in the axial direction, and each of the plurality of friction surface elements (5) has at least a second thickness D2 in the axial direction, and the first thickness D1 and the second thickness D2 are different.

9. The frictional shift element of claim 1, wherein friction surface elements of the plurality of friction surface elements (5) have chamfers in an inlet area and in an outlet area in the circumferential direction.

10. The frictional shift element of claim 1, wherein friction surface elements of the plurality of friction surface elements (5) have chamfers in an inlet area or in an outlet area in the circumferential direction.

11. A method for producing a frictional shift element for a transmission of a vehicle with a first friction element (1) and a second friction element (3), one friction element (1, 3) of the first friction element (1) and the second friction element (3) having a friction surface (7) that is approximately annular, the other friction element (1, 3) of the first friction element (1) and the second friction element (3) having an approximately annular base body, said method comprising:
manufacturing the second friction element (3) from a semi-finished product of a first material in a first step (110), wherein a substantially cylindrical recess is produced in the semi-finished product; and
manufacturing the first friction element (1) from the semi-finished product from the first step (110) in a subsequent second step (120),
wherein the manufacturing in the subsequent second step (120) is carried out substantially coaxially to the cylindrical recess.

12. The method of claim 11, further comprising manufacturing a plurality of friction surface elements (5) from the first material or a second material different from the first material.

13. The method of claim 12, further comprising manufacturing a plurality of recesses in the first or second friction element for receiving the plurality of friction surface elements (5).

14. The method of claim 13, further comprising joining each of the plurality of friction surface elements (5) at a respective recess of the plurality of recesses (16).

15. The method of claim 14, further comprising fixing the plurality of friction surface elements (5) to the first or second friction element (1, 3) by a forming process, wherein the forming process is carried out at each of the plurality of friction surface element (5) and at the first or second friction element (1, 3).

16. The method of claim 14, further comprising fixing the plurality of friction surface elements (5) to the first or second friction element (1, 3) by a forming process, wherein the forming process is carried out at each of the plurality of friction surface element (5) or at the first or second friction element (1, 3).

17. The method of claim 12, further comprising welding the plurality of friction surface elements (5) to the first or second friction element (1, 3).

18. A method for producing a frictional shift element for a transmission of a vehicle with a first friction element and a second friction element, one friction element of the first friction element and the second friction element having a friction surface that is approximately annular, the other friction element of the first friction element and the second friction element having an approximately annular base body, the method comprising:
manufacturing the first friction element from a semi-finished product of a first material in a first step, wherein material waste is produced in the first step; and
manufacturing the second friction element from the material waste in a subsequent second step.

* * * * *